(12) United States Patent
Morisaki et al.

(10) Patent No.: US 8,508,806 B2
(45) Date of Patent: Aug. 13, 2013

(54) COMMUNICATION DEVICE CAPABLE OF DISPLAYING PREVIEW OF TRANSMISSION DATA

(75) Inventors: Hiroshi Morisaki, Kitanagoya (JP); Kazunobu Asai, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 1503 days.

(21) Appl. No.: 11/689,274

(22) Filed: Mar. 21, 2007

(65) Prior Publication Data

US 2007/0229926 A1   Oct. 4, 2007

(30) Foreign Application Priority Data

Mar. 30, 2006   (JP) .................................. 2006-095353
Sep. 29, 2006   (JP) .................................. 2006-266915

(51) Int. Cl.
*H04N 1/00*   (2006.01)
*G06F 3/12*   (2006.01)
*G06K 15/00*   (2006.01)

(52) U.S. Cl.
USPC ............... 358/426.05; 358/1.15; 358/1.16; 358/1.17; 358/401; 358/406

(58) Field of Classification Search
USPC ............... 358/1.13–1.16, 527, 538, 401–404, 358/434–442, 444
See application file for complete search history.

(56) References Cited

U.S. PATENT DOCUMENTS

| 5,539,530 | A | * | 7/1996 | Reifman et al. | 358/402 |
| 5,854,693 | A | * | 12/1998 | Yoshiura et al. | 358/468 |
| 5,872,637 | A | * | 2/1999 | Nakanishi | 358/403 |
| 6,072,600 | A | * | 6/2000 | Wertsberger | 358/479 |
| 6,469,797 | B2 | * | 10/2002 | Sakai | 358/1.15 |
| 6,646,766 | B1 | | 11/2003 | Suzuki et al. | |
| 6,806,977 | B1 | * | 10/2004 | Freeny et al. | 358/1.15 |
| 7,113,293 | B2 | * | 9/2006 | Mori et al. | 358/1.13 |
| 7,336,775 | B2 | * | 2/2008 | Tanaka et al. | 379/93.17 |
| 7,339,707 | B2 | * | 3/2008 | Burke | 358/446 |
| 7,643,167 | B2 | * | 1/2010 | Tashiro et al. | 358/1.15 |
| 2002/0101620 | A1 | * | 8/2002 | Sharif et al. | 358/400 |
| 2003/0112464 | A1 | * | 6/2003 | Garcia et al. | 358/1.15 |
| 2003/0214684 | A1 | * | 11/2003 | Kuboki | 358/474 |
| 2004/0027622 | A1 | | 2/2004 | Suzuki et al. | |
| 2004/0145779 | A1 | * | 7/2004 | Kuribayashi | 358/1.16 |

(Continued)

FOREIGN PATENT DOCUMENTS

JP   60-8836 A   1/1985
JP   3240364   10/1991

(Continued)

OTHER PUBLICATIONS

JP Office Action dtd Nov. 11, 2008, JP App. 2006-266915.

(Continued)

*Primary Examiner* — Twyler Haskins
*Assistant Examiner* — Jonathan Beckley
(74) *Attorney, Agent, or Firm* — Banner & Witcoff, Ltd.

(57) ABSTRACT

An image data is generated by scanning an original. The image data is converted and stored into a RAM. Preview data is generated from the converted data and then displayed on a display unit. When a transmission command is received after the display unit displays the display data, the converted data is transmitted to a prescribed destination.

16 Claims, 23 Drawing Sheets

(56) References Cited

U.S. PATENT DOCUMENTS

| | | | |
|---|---|---|---|
| 2004/0165207 A1* | 8/2004 | Kashiwagi | 358/1.13 |
| 2004/0179234 A1* | 9/2004 | Yoshitani | 358/1.15 |
| 2004/0243588 A1* | 12/2004 | Tanner et al. | 707/100 |
| 2005/0249340 A1* | 11/2005 | Carpenter | 379/100.01 |
| 2006/0132821 A1* | 6/2006 | Nonaka et al. | 358/1.13 |
| 2006/0265390 A1* | 11/2006 | Aldrich et al. | 707/10 |

FOREIGN PATENT DOCUMENTS

| | | |
|---|---|---|
| JP | 4-222159 A | 8/1992 |
| JP | 6-46193 A | 2/1994 |
| JP | 6-230625 A | 8/1994 |
| JP | 9-18643 A | 1/1997 |
| JP | 11-127324 A | 5/1999 |
| JP | 11252359 | 9/1999 |
| JP | 11298658 | 10/1999 |
| JP | 2000-059553 A | 2/2000 |
| JP | 2000062288 | 2/2000 |
| JP | 2000-101757 A | 4/2000 |
| JP | 2000-172025 A | 6/2000 |
| JP | 2000-184110 A | 6/2000 |
| JP | 3108928 B2 | 11/2000 |
| JP | 3165996 B2 | 5/2001 |
| JP | 2002-111992 A | 4/2002 |
| JP | 2002244823 | 8/2002 |
| JP | 2003-244369 A | 8/2003 |
| JP | 2003283741 | 10/2003 |
| JP | 2004-007047 A | 1/2004 |
| JP | 2004-104263 A | 4/2004 |
| JP | 2004222246 | 8/2004 |
| JP | 2005-026849 A | 1/2005 |
| JP | 2005142989 | 6/2005 |
| JP | 2005-210255 A | 8/2005 |
| JP | 2005-268906 A | 9/2005 |
| JP | 2006-109254 A | 4/2006 |
| JP | 2006-150835 A | 6/2006 |
| JP | 2006-222580 A | 8/2006 |
| JP | 2006-262186 A | 9/2006 |

OTHER PUBLICATIONS

JP Office Action dtd Jan. 20, 2009, JP Appln. 2006-095353.
JP Office Action dtd Apr. 14, 2009, JP Appln. 2006-095353, English translation.

* cited by examiner

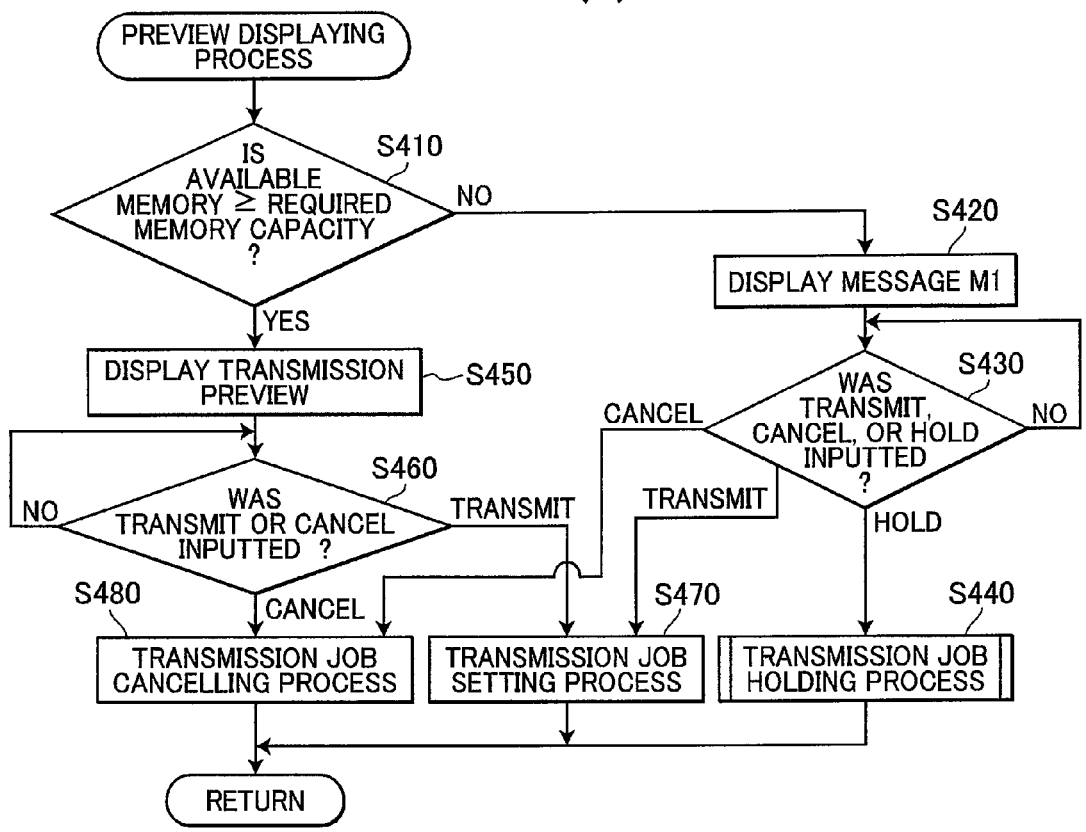

① TRANSMISSION PREVIEW

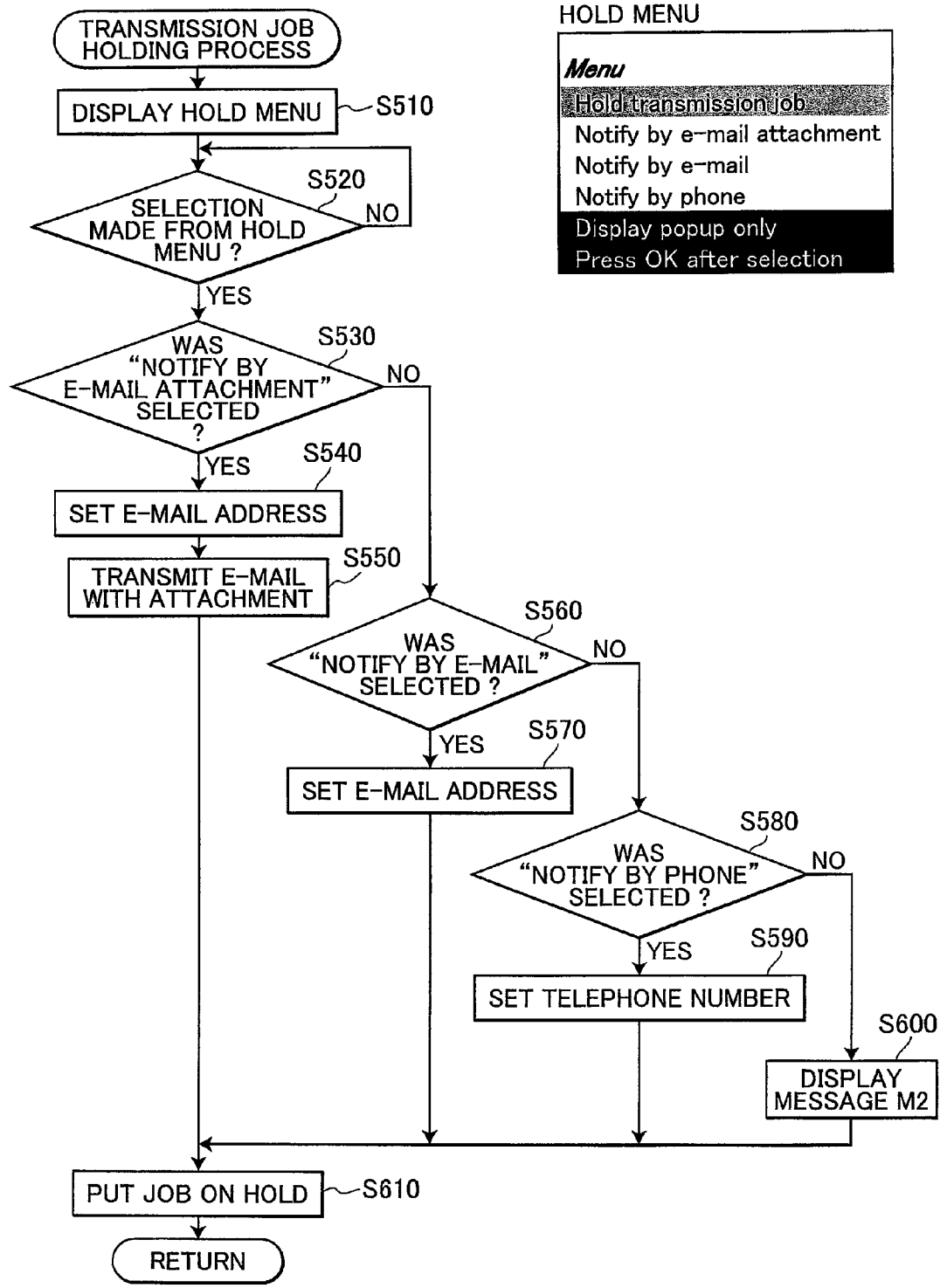

MESSAGE M2

MESSAGE M3

COMMUNICATION DEVICE CAPABLE OF DISPLAYING PREVIEW OF TRANSMISSION DATA

CROSS REFERENCE TO RELATED APPLICATIONS

This application claims priority from Japanese Patent Application Nos. 2006-095353 and 2006-266915 filed in Mar. 30, 2006 and Sep. 29, 2006, respectively. The entire content of each of these priority applications is incorporated herein by reference.

TECHNICAL FIELD

The disclosure relates to a communication device for reading an original to obtain scanned data and for transmitting the scanned data to a prescribed destination.

BACKGROUND

Some communication devices well known in the art have is a function for printing image data received from an external device, and a function for displaying the received image data on a display unit prior to printing. For example, a communication device disclosed in Japanese unexamined patent application publication No. 2000-062288 allows the user to preview received image data on a display unit and to select only image data that must be printed, thereby preventing unnecessary consumption of paper and ink caused by printing unneeded image data.

Further, some copy machines well known in the art scan a plurality of sheets of an original and display the acquired image data on a display unit prior to printing. For example, the copy machine disclosed in US 2004/0165207 A1 sequentially scans 20 sheets of an original, accumulating the scanned image data, and generates confirmation image data from the accumulated image data to be displayed on the display unit. This image confirmation process (preview process) is performed when the user gives a command to the copy machine to execute the process. When the user gives a command to the copy machine to rescan the original after previewing the confirmation image data displayed on the display unit, the copy machine discards image data for the pages specified by the user and inserts rescanned image data for the same pages at the discarded page positions in the accumulated data. Once the user has previewed the scanned image data for the original and indicated to the copy machine that the scanning is complete, the copy machine prints the accumulated image data on recording paper. Hence, this type of copy machine allows the user to confirm scanned data for an original, even when the entire series of pages in the original have not yet been scanned.

However, these conventional copy machines wait for the user to issue an instruction or command to execute the image confirmation process prior to executing the preview process. Therefore, if the user wishes to view the image data for each sheet of the original, the user must input a command to execute the image confirmation process into the copy machine each time one of the sheets of original is scanned. Since the user must perform so many operations, the conventional copy machines have not been user-friendly.

SUMMARY

It is an object of the invention to provide a communication device that reads an original to obtain scanned data and transfers the scanned data to a prescribed destination, while avoiding wasteful communications.

It is another object of the invention to provide an image reading device and an image data displaying program for displaying scanned image data on a display unit.

In order to attain the above and other objects, the invention provides a communication device including an image data generating unit that generates first image data by reading an image on an original, an image data storing unit that stores the first image data, a preview data generating unit that generates preview data from the first image data, a preview display unit that displays a predetermined-unit-worth of the preview data at one time, and a transmitting unit that transmits the first image data to a first destination upon reception of a transmission command after the preview display unit has displayed the preview data.

There is also provided an image reading device including a reading unit that generates first image data by reading an original, a first display unit that displays the first image data, and a selecting unit that selects one of a first mode in which the first display unit displays the first image data after the reading unit has read the entire original and a second mode in which the first display unit displays the first image data each time the reading unit reads one page of the original.

There is also provided a storage medium storing a set of program instructions executable on an image reading device and usable for displaying image data. The instruction includes obtaining image data by reading an original, selecting one of a first mode in which image data is displayed on a display unit after the entire original has been read and a second mode in which image data is displayed on the display unit each time one page of the original is read, and controlling the display unit to display the image data in accordance with the selected one of the first mode and the second mode.

BRIEF DESCRIPTION OF THE DRAWINGS

Illustrative embodiments in accordance with the invention will be described in detail with reference to the following figures wherein:

FIG. 4(*b*) is a top view of an operating panel on the multifunction device;

FIG. 7(*b*) is an explanatory diagram showing a sample error message;

FIG. 9(*a*) is a flowchart illustrating steps in a preview displaying process;

FIG. 9(*b*) is an explanatory diagram showing a sample display of a message M1;

FIG. 11(a) is a flowchart illustrating steps in a transmission job holding process;

FIG. 11(b) is an explanatory diagram showing an example of a hold menu;

DETAILED DESCRIPTION

Figure 1:
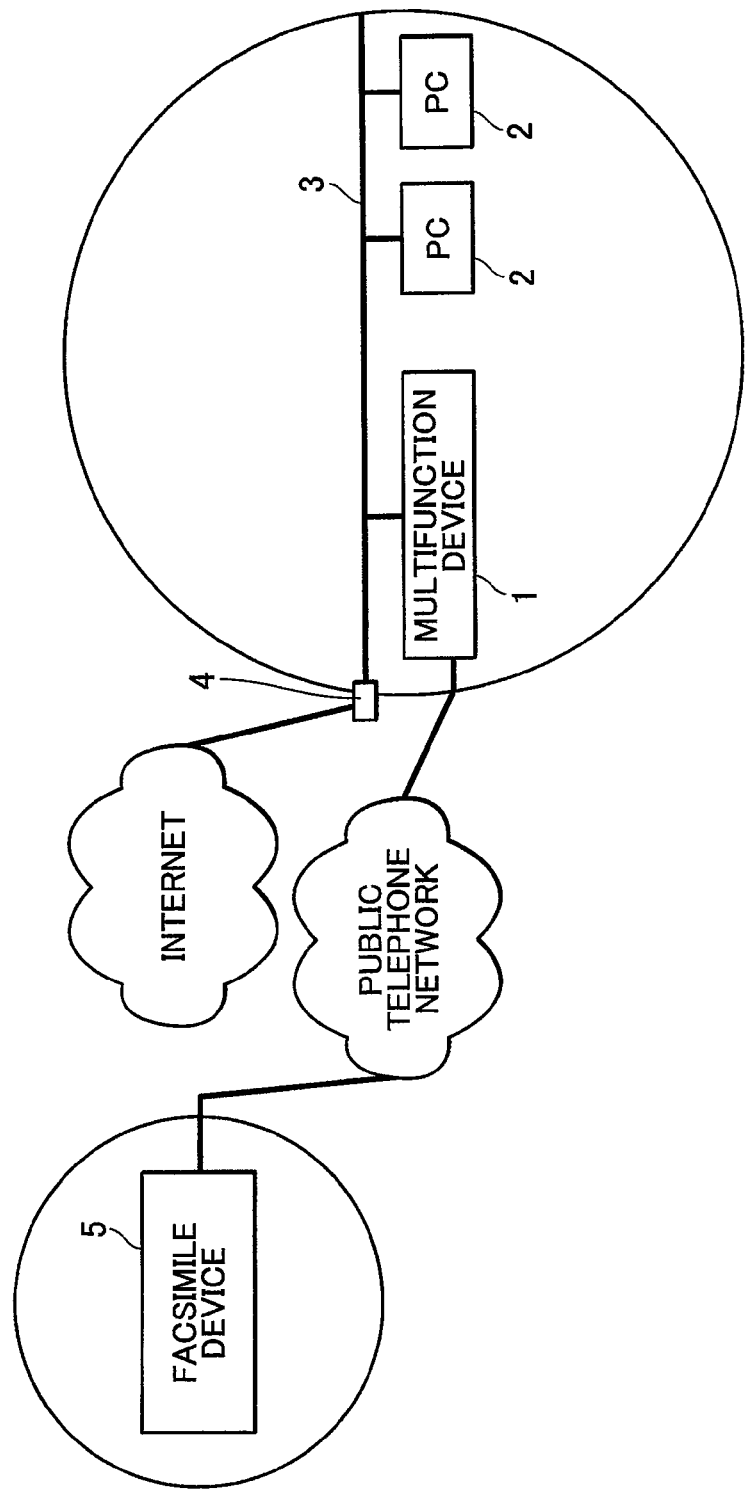
FIG. 1 is an explanatory diagram conceptually illustrating a network system according to a first embodiment of the invention.

Next, preferred embodiments of the invention will be described while referring to the accompanying drawings wherein like parts and components are designated by the same reference numerals to avoid duplicating description.

First Embodiment

First, a first embodiment of the invention will be described. FIG. 1 is an explanatory diagram conceptually illustrating a network system including a multifunction device 1 according to the first embodiment of the invention. The multifunction device 1 is one example of an image-reading device. A plurality of personal computers 2 well known in the art are connected to the multifunction device 1 via a LAN 3. The multifunction device 1 connects to a facsimile device 5 via a public telephone network and exchanges facsimile data with the facsimile device 5. The multifunction device 1 can also connect through an internet via the LAN 3 and a firewall 4 for exchanging e-mail and Internet facsimile data, for example.

Figure 2:
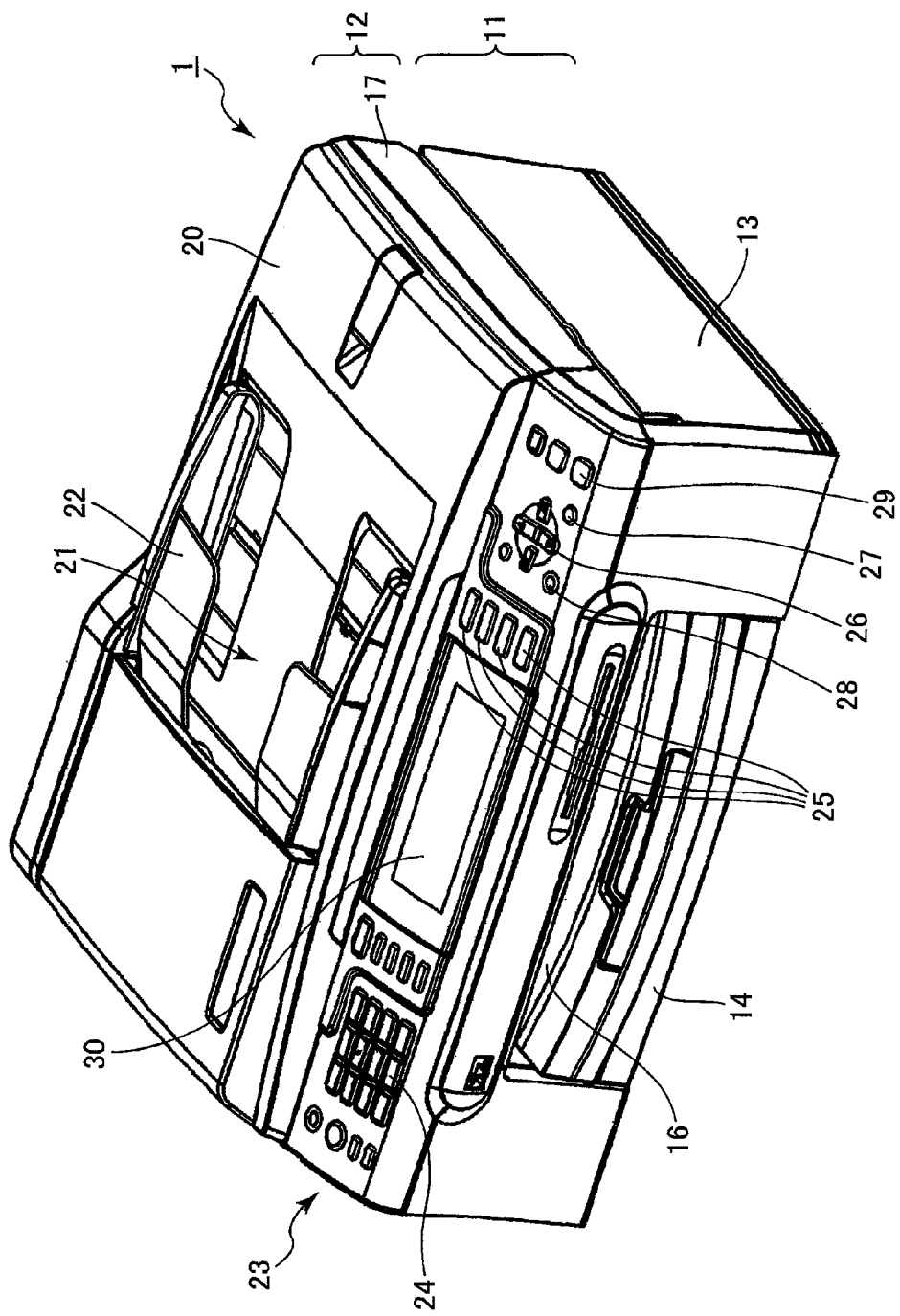
FIG. 2 is a perspective view showing the appearance of a multifunction device in FIG. 1 when a document cover is closed.
Figure 3:
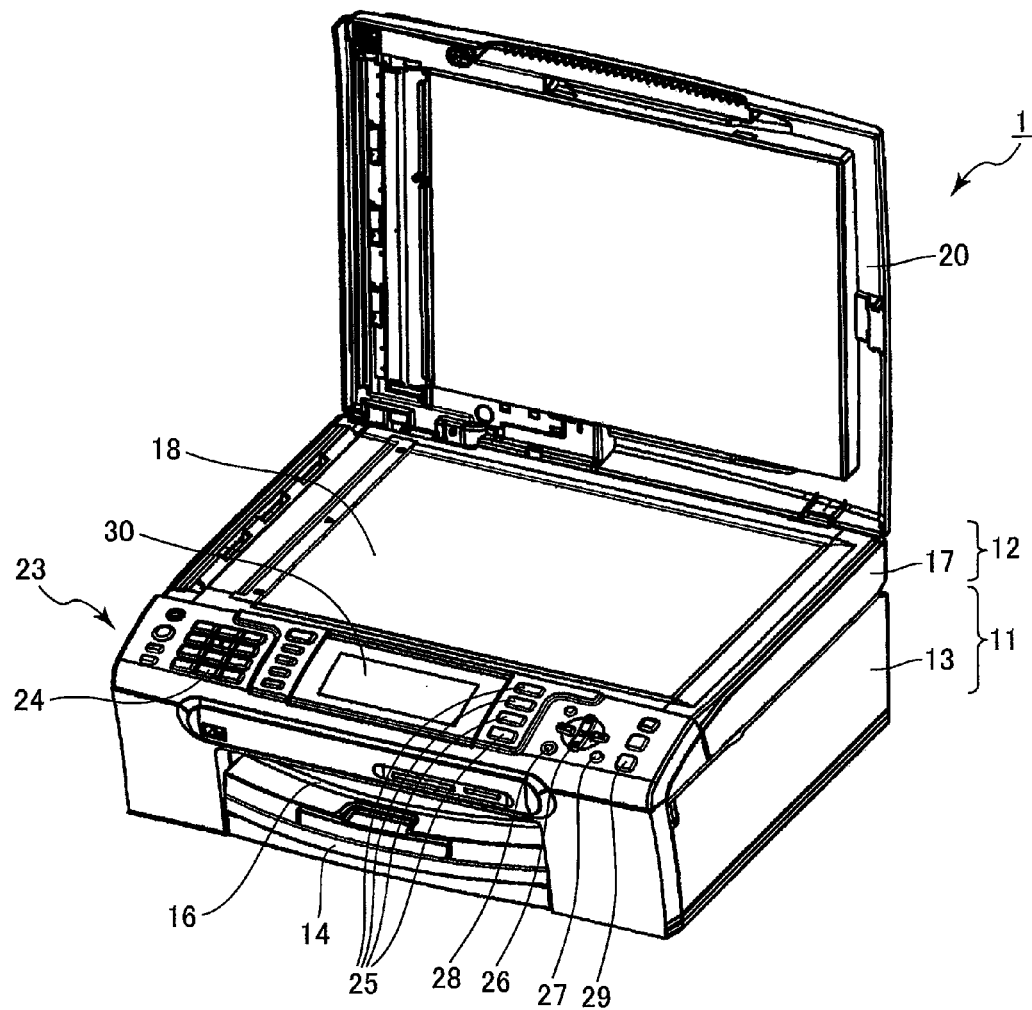
FIG. 3 is a perspective view showing the appearance of the multifunction device when the document cover is open.

FIG. 2 is a perspective view showing the appearance of the multifunction device 1 when an document cover 20 of the multifunction device 1 is closed. FIG. 3 is a perspective view showing the appearance of the multifunction device 1 when the document cover 20 is open.

The multifunction device 1 is a flatbed image-forming device including an image-forming unit 11 and an image-reading unit 12. The multifunction device 1 implements a facsimile function, a copier function, a scanner function, and a printer function.

The image-forming unit 11 is for forming images on recording paper based on image data and includes a box-like main casing 13 and a paper cassette 14 detachably mounted in the main casing 13. The paper cassette 14 accommodates a plurality of sheets of recording paper stacked therein. The main casing 13 houses a printing unit 15 (see FIG. 4(a)) that forms color or monochromatic images on recording paper fed from the paper cassette 14. After the printing unit 15 forms images on the recording paper, the recording paper is discharged onto a discharge unit 16 formed on the top surface of the paper cassette 14.

The image-reading unit 12 is coupled to the image-forming unit 11 so as to cover the discharge unit 16 and is capable of pivoting on the image-forming unit 11 via first hinges (not shown). As shown in FIG. 3, the image-reading unit 12 includes an upper casing 17 and the document cover 20. The document cover 20 is coupled to the upper casing 17 and capable of pivoting on the upper casing 17 about second hinges (not shown). The upper casing 17 includes a platen glass 18 on which an original is placed, and houses a scanning unit 19 (see FIG. 4(a)) for reading images from an original placed on the platen glass 18. As shown in FIG. 2, the document cover 20 is provided with an automatic document feeder (ADF) 21 well known in the art, and a document tray 22 for holding an original to be scanned. The ADF 21 is configured to continuously feed an original set in the document tray 22 one sheet at a time to the platen glass 18 (see FIG. 3).

A control panel 23 is provided on the upper casing 17 of the image reading unit 12 and enables the user to input settings for operations of the multifunction device 1.

Figure 4A:
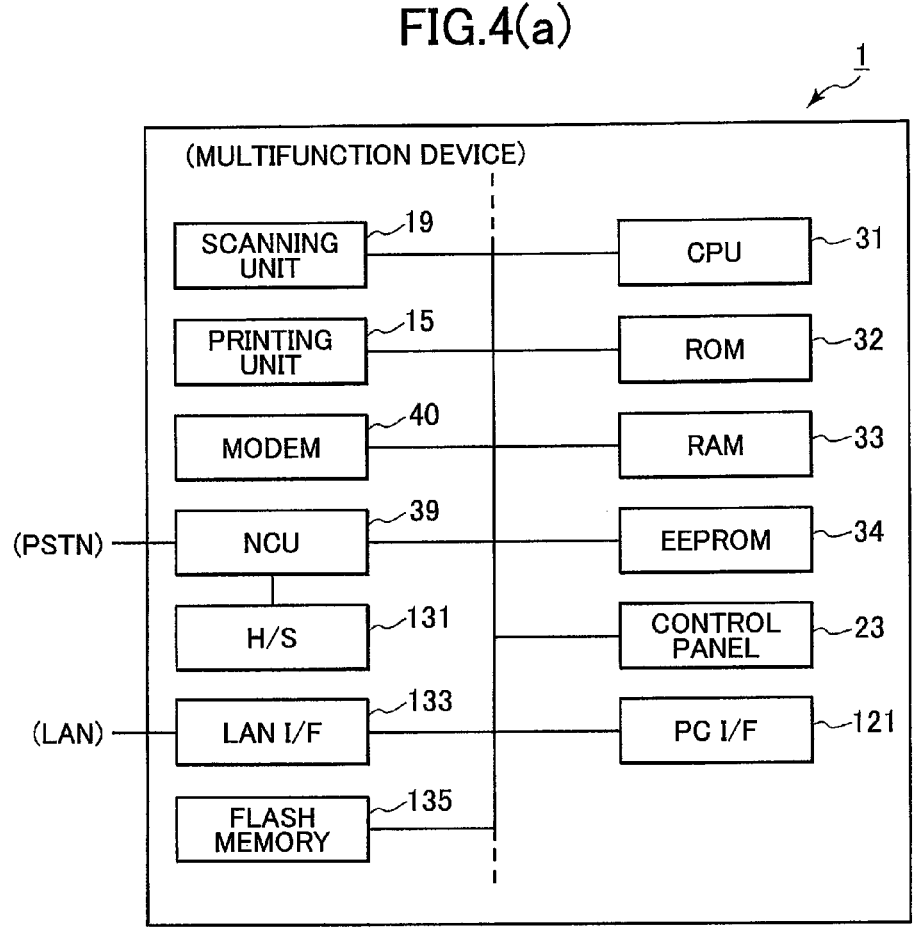
FIG. 4(*a*) is a block diagram showing the electrical structure of the multifunction device.

FIG. 4(a) is a block diagram showing the general structure of the multifunction device 1.

As shown in FIG. 4(a), the multifunction device 1 includes a CPU 31 for performing overall control of each component in the multifunction device 1, a ROM 32 for storing various programs, a RAM 33 used as a work area when the CPU 31 executes the programs stored in the ROM 32, a EEPROM 34 for storing various settings, the control panel 23 described above, a PC interface 121, the scanning unit 19 and the printing unit 15 described above, a modem 40, a network control unit (NCU) 39 connected to a public switched telephone network (PSTN), a handset 131, a LAN interface 133 connected to the LAN 3, and a flash memory 135. The PC interface 121 may be a universal serial bus (USB) interface, for example, and enables communication between the multifunction device 1 and the personal computers 2.

By executing the programs stored in the ROM 32, the CPU 31 performs processes in response to commands inputted on the control panel 23, the personal computers 2, or a LAN terminal. More specifically, by executing the program stored in the ROM 32, the CPU 31 controls the scanning unit 19, the printing unit 15, the modem 40, the NCU 39, the LAN interface 133, and the like to implement various functions known in the art, including a facsimile function, a telephone (voice communications) function, a copier function, a scanner function, and a PC fax function.

In the PC fax function, the CPU 31 transmits a data file inputted via the PC interface 121 to a destination communication terminal in an e-mail message, or converts the data file to facsimile data and transmits this data to a destination facsimile device 5.

The EEPROM 34 stores various parameters defining operations of the multifunction device 1. More specifically, the EEPROM 34 stores settings required for performing data communications with communication terminals on the LAN 3 or on the Internet (such as TCP/IP protocol communications), a telephone directory including data representing telephone numbers for various contacts in association with identification data giving the name and the like of the contacts, speed dial data indicating a speed dial number, and the like.

The scanning unit 19 optically reads images from the original and generates image data representing these images. The printing unit 15 forms images on recording paper based on the image data generated by the scanning unit 19 and facsimile data transmitted from an external facsimile device 5. The printing unit 15 may be an inkjet printer, a laser printer, or other device well known in the art.

Before the printing unit 15 performs an image recording process, the data is temporarily stored in memory, such as on the EEPROM 34.

The modem 40 is a modulating/demodulating device used to exchange facsimile data with external facsimile device 5 via the NCU 39. The NCU 39 performs control processes for transmitting dialing signals required to call another communication terminal connected to the PSTN, to put the line on hold, and the like. The handset 131 is provided with a microphone and a speaker. The handset 131 picks up the user's voice and transmits voice signals based on the voice to another telephone connected via the NCU 39, while playing voice signals received from the other telephone.

The LAN interface 133 is capable of connecting to the Internet via the LAN 3 in order to perform data communications with terminals on the LAN 3 or the Internet based on instructions from the CPU 31.

The flash memory 135 can be detachably mounted in the multifunction device 1, for example, and is capable of storing image data taken by a digital camera or the like and personal data for the user, such as the user's e-mail address, telephone number, and the like. When the flash memory 135 is mounted in the multifunction device 1, the CPU 31 can read data stored thereon.

Figure 4B:
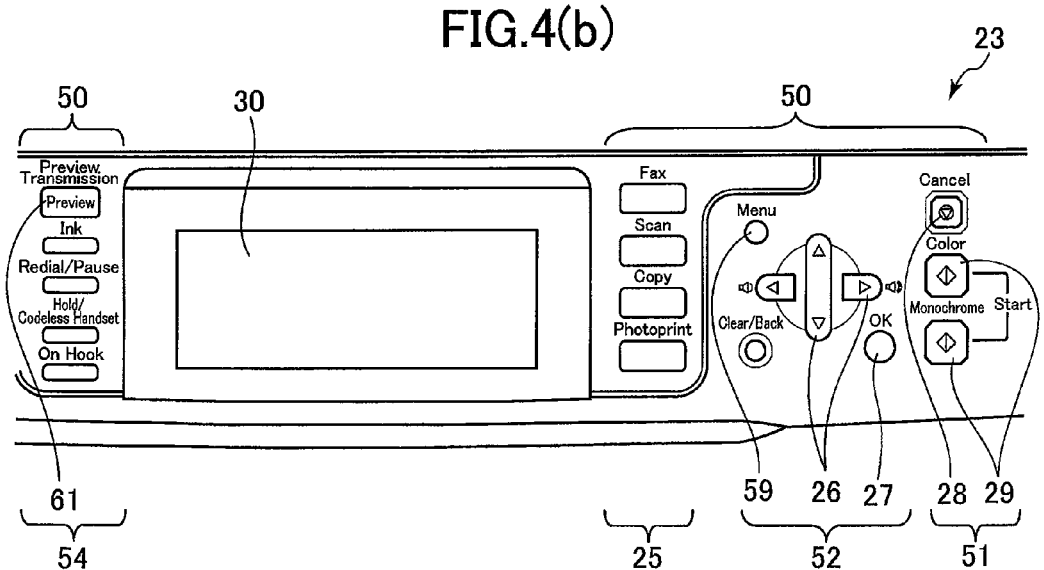

Next, the control panel 23 will be described in detail with reference to FIG. 4(*b*). FIG. 4(*b*) is a top view showing the appearance of the control panel 23. The control panel 23 may be provided in a desired region of the multifunction device 1, excluding the bottom surface, and generally on the upper portion. The control panel 23 includes a plurality of operating keys 50 that accept user operations, and the display unit 30 for displaying messages for the user, the operating status of the multifunction device 1, image data, and the like, in color or in monochrome.

When the operating keys 50 are operated (pressed), signals corresponding to the operated keys are transferred to the CPU 31. Further, the display unit 30 displays images based on display commands received from the CPU 31.

The operating keys 50 include a ten-key pad 24 (see FIG. 2) for inputting numbers, process execution keys 51, display switching keys 52, function switching keys 25, and communication keys 54. The process execution keys 51 includes Start keys 29 for initiating a facsimile transmission, a copy process, or the like; and a Cancel key 28 for halting a process in progress.

The display switching keys 52 includes navigation keys 26 for changing the image displayed on the display unit 30, an OK key 27 for setting content selected by the navigation keys 26, and a menu key 59 for displaying function-specific menus for the facsimile function, the scanner function, the copier function, and the digital image printing function. The function switching keys 25 are provided for switching the function executed by the multifunction device 1 and include a separate key for each function. The communication keys 54 are primarily used for voice calls and facsimile transmissions and receptions. The communication keys 54 include a Preview key 61 for displaying on the display unit 30 image data received with the facsimile function prior to printing or image data (transmission data) to be transmitted using the facsimile function prior to transmission. Only one Preview key 61 is provided on the control panel 23.

Figure 5:
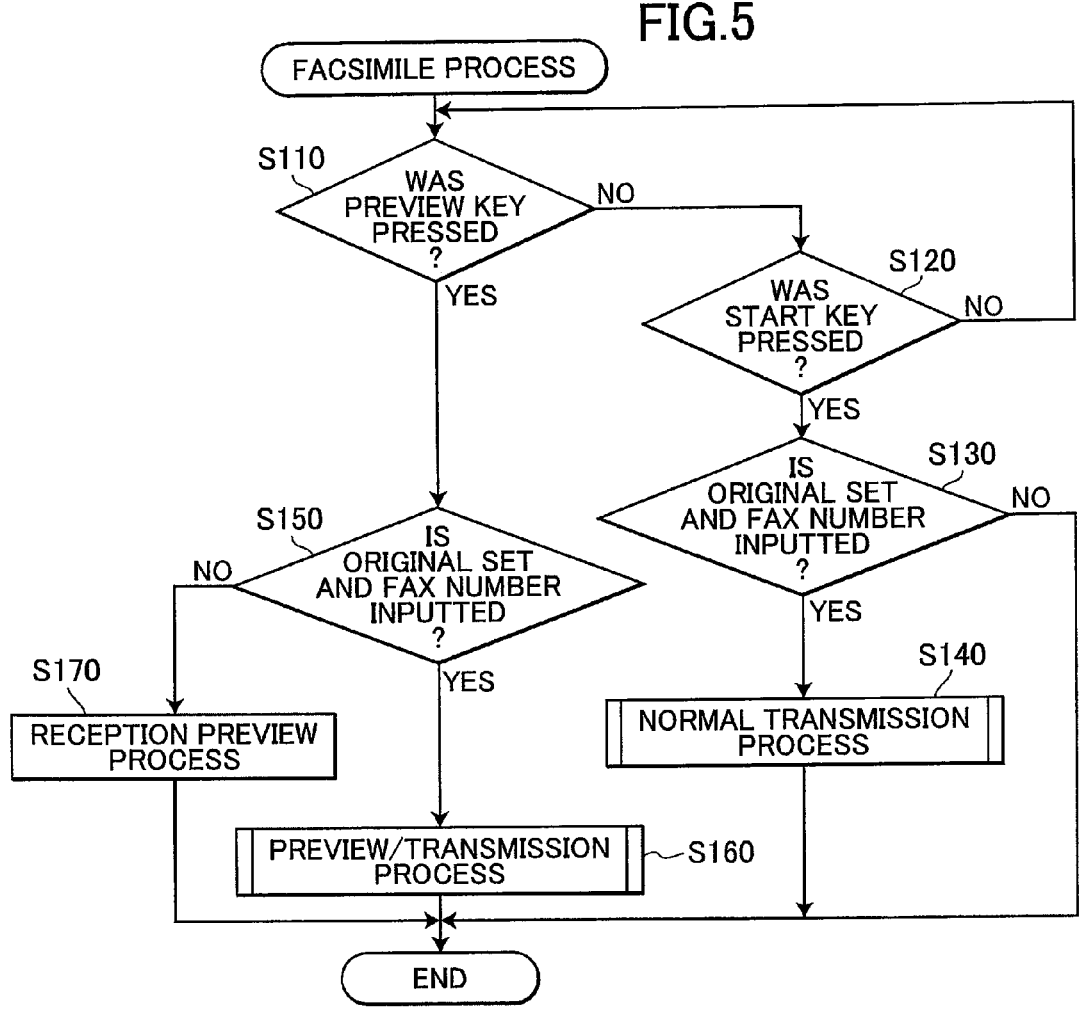
FIG. 5 is a flowchart illustrating steps in a facsimile process.

When the user switches the multifunction device 1 to the facsimile function by operating the function switching keys 25, the multifunction device 1 executes a facsimile process shown in FIG. 5.

In the facsimile process shown in FIG. 5, the CPU 31 of the multifunction device 1 determines in S110 and S120 whether the user has pressed the Preview key 61 or the Start key 29, respectively. If neither the Preview key 61 nor the Start key 29 has been pressed (S110: NO, S120: NO), then the CPU 31 loops back to S110 and repeats the process.

If the CPU 31 determines that the Start key 29 has been pressed (S110: NO, S120: YES), then in S130, the CPU 31 determines whether an original has been set in image reading unit 12 and whether a telephone number for the destination of the facsimile transmission has already been inputted. If the original has been set in the image reading unit 12 and the telephone number has been inputted (9130: YES), then in S140, the CPU 31 executes a normal transmission process described later for transmitting facsimile data without displaying a preview of the facsimile data, and subsequently ends the facsimile process.

If either an original is not set in the image reading unit 12 or the telephone number for the transmission destination has not been inputted (S130: NO), then the CPU 31 aborts the facsimile process without transmitting facsimile data. In such a case (S130: NO), the CPU 31 may produce a sound from a speaker (not shown) indicating an error or may display a help message on the display unit 30, such as "Please set the original in the scanner" or "Please input a facsimile number."

However, if the CPU 31 determines in S110 that the Preview key 61 has been pressed (S110: YES), then in S150, the CPU 31 determines whether an original has been set in the image reading unit 12 and whether a telephone number for the destination of the facsimile transmission has already been inputted. Here, when the multifunction device 1 (CPU 31) is switched to the facsimile function, the CPU 31 can switch between a "preview display/transmission mode" in which the CPU 31 displays a preview of image data and subsequently transmits the facsimile and a "received image display mode" for displaying a preview of received facsimile data prior to printing the facsimile data, based on whether the original is set in the image reading unit 12 and whether the telephone number for the destination has been inputted.

If an original has been set in the image reading unit 12 and the telephone number of the destination has been inputted (S150: YES), then this means that the multifunction device 1 is in the "preview display/transmission mode," and thus the CPU 31 executes in S160 a preview/transmission process described later for transmitting facsimile data after displaying a preview, and subsequently ends the facsimile process.

However, if either an original has not yet been set in the image reading unit 12 or a telephone number for the destination of the facsimile transmission has not been inputted (S150: NO), then this means that the multifunction device 1 is in the "received image display mode," and thus the CPU 31 executes in S170 a reception preview process described later for displaying on the display unit 30 facsimile data that has been transmitted to the multifunction device 1 but not yet printed, and subsequently ends the facsimile process.

It should be noted that the multifunction device 1 may be configured to toggle the "preview display/transmission mode" and the "received image display mode" only based on whether the telephone number for the destination has been inputted or only based on whether the original is set in the image forming unit 12.

Figure 6:
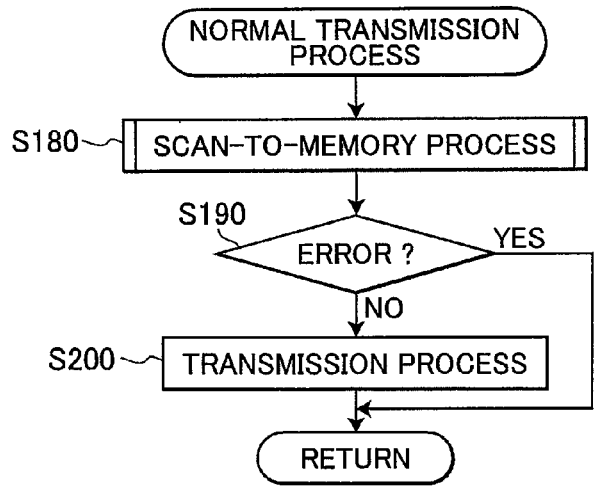
FIG. 6 is a flowchart illustrating steps in a normal transmission process.
Figure 7:
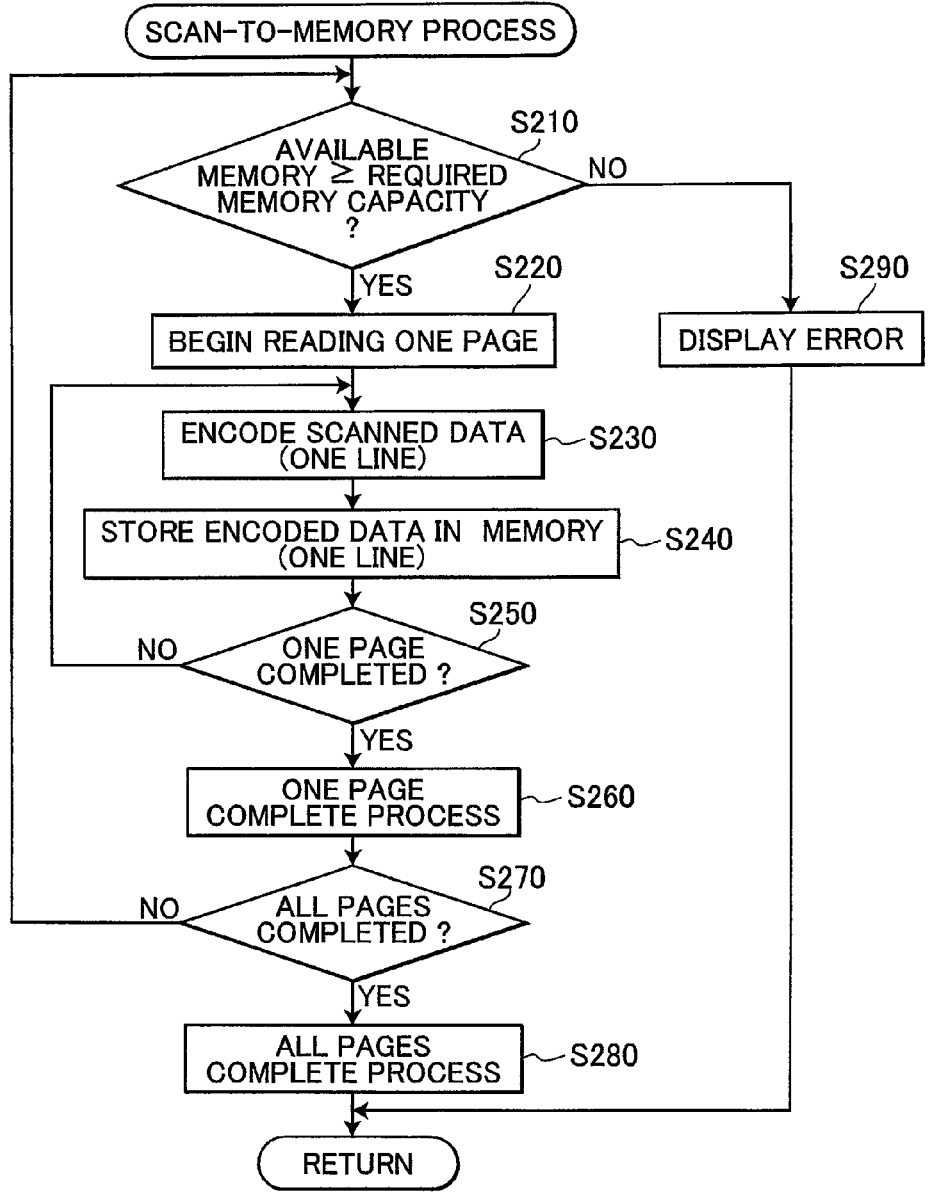
FIG. 7(*a*) is a flowchart illustrating steps in a scan-to-memory process.

Next, the normal transmission process of S140 will be described with reference to FIG. 6. In S180 at the beginning of the normal transmission process, the CPU 31 executes a scan-to-memory process. The scan-to-memory process is shown in detail in FIG. 7(*a*). As shown in FIG. 7(*a*), in S210 of the scan-to-memory process, the CPU 31 determines whether or not the available memory (in the RAM 33, in this embodiment) is greater than or equal to a memory capacity required for scanning a single page of original (i.e., for storing one page worth of scanned data).

If it is determined in S210 that the available memory is less than the required memory capacity (S210: NO), then in S290, the CPU 31 executes a process to display an error message, such as "The operation failed due to insufficient memory," shown in FIG. 7(*b*), on the display unit 30 indicating that the original image data could not be read, and also stores data indicating the occurrence of error into the RAM 33. Subsequently, the CPU 31 ends the scan-to-memory process.

It should be noted that in S290 the CPU 290 may also displays a preview for data that has been scanned to that point in addition to the error message if one or more pages but not all pages of original has been scanned.

However, if the available memory is at least as large as the required memory capacity (S210: YES), then in S220, the CPU 31 controls the scanning unit 19 to begin reading the first page of the original. In S230, the CPU 31 compresses and encodes each line of image data (scanned data) read by the scanning unit 19, producing converted data. In S240, the CPU 31 stores the converted data into a memory (the RAM 33, in this embodiment). It should be noted that in place of the processes in S230 and S240, the CPU 31 may store the image data read by the scanning unit 19 into the memory without change.

In S250, the CPU 31 determines whether or not one page worth of the original has been read. If not (S250: NO), then the CPU 31 repeats the process in S230-S250 until reading of one page has been completed.

When one page worth of the original has been read (S250: YES), then in S260, the CPU 31 executes a one page complete process for writing data indicating that one page worth of the original has been read to the converted data. In S270, the CPU 31 determines whether or not the entire original has been read. If not (S270: NO), then the CPU 31 repeats the process from S210.

On the other hand, if so (S270: YES), then in S280, the CPU 31 executes an all pages complete process for writing data indicating that the entire original has been read to the converted data, and subsequently ends the scan-to-memory process.

Returning to FIG. 6, in S190, the CPU 31 determines whether or not the data indicating the occurrence of error was stored in the RAM 33 during the scan-to-memory process executed in S180. If so (S190: YES), then the CPU 31 ends the normal transmission process without transmitting data. However, if not (S190: NO), then in S200, the CPU 31 executes a transmission process to call the inputted telephone number and transmit the converted data stored in the memory (the RAM 33). Subsequently, the CPU 31 ends the normal transmission process.

It should be noted that when transmitting data in the transmission process of S200, the CPU 31 may transmit the converted data stored in the memory without change, or may first convert the converted data to a prescribed format (a transmission format) as needed and transmit thus converted data.

Figure 8:
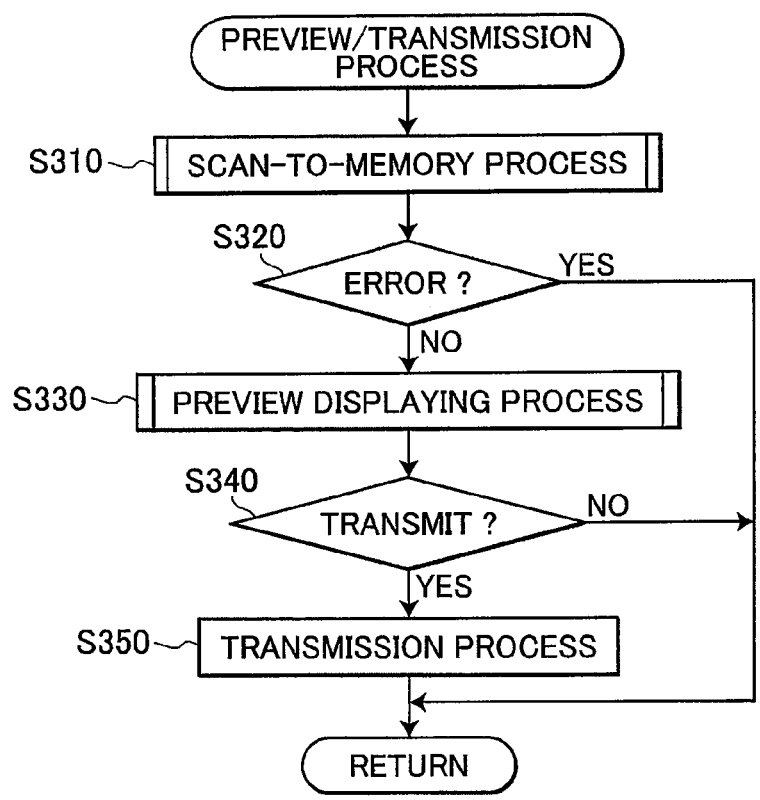
FIG. 8 is a flowchart illustrating steps in a preview transmission process.

Next, the preview/transmission process executed in S160 of FIG. 5 will be described with reference to FIG. 8. As shown in FIG. 7, in S310 of the preview/transmission process, the CPU 31 performs the scan-to-memory process described above (FIG. 7(*a*)). Then in S320, the CPU 31 determines whether or not data indicating the occurrence of error was stored in the RAM 33 during the scan-to-memory process executed in S310. If so (S310: YES), then the CPU 31 ends the preview/transmission process without displaying or transmitting data. However, if not (S320: NO), then in S330, the CPU 31 performs a preview displaying process for displaying on the display unit 30 images scanned from the original in the scan-to-memory process of S310.

That is, if a negative determination was made in S210 of FIG. 7(*a*), then the CPU 31 determines in S320 that an error has occurred and skips the preview display process of S330. Only when a positive determination was made in S210 of FIG. 7(*a*) can the CPU 31 execute the preview displaying process of S330 for displaying a preview.

FIG. 9(*a*) illustrates steps in the preview displaying process. In S410 of the preview displaying process, the CPU 31 determines whether the available memory (in the RAM 33, for example) is greater than or equal to the memory capacity required for displaying a preview of, for example, one sheet worth of the original.

If not (S410: NO), then in S420, the CPU 31 displays a message A on the display unit 30 indicating a preview cannot be displayed.

FIG. 9(*b*) shows a sample message M1 displayed on the display unit 30 in S420. Specifically, in S420, the CPU 31 displays a message, such as "The preview cannot be displayed due to insufficient memory," notifying the user that image data for the original cannot be read, and prompts the user to select a next course of action from among "Transmit," "Cancel," and "Hold."

Here, the Start key 29 is assigned to "Transmit," the Cancel key 28 is assigned to "Cancel," and the OK key 27 is assigned to "Hold." In other words, each of the "Transmit," "Cancel," and "Hold" is assigned to a different key.

Returning to FIG. 9(*a*), in S430, the CPU 31 determines whether or not the user has inputted a selection for one of "Transmit," "Cancel," and "Hold." If none of these have been selected (S430: NO), the CPU 31 loops back to S430 and waits for one of the selections to be inputted.

If "Hold" has been inputted (S430: Hold), then in S440 the CPU 31 executes a transmission job holding process for putting a transmission job based on the original read in the scan-to-memory process on hold, and subsequently ends the preview displaying process. The transmission job holding process will be described later in greater detail.

If "Transmit" has been inputted (S430: Transmit), then in S470, the CPU 31 executes a transmission job setting process for storing data into the RAM 33 indicating that a Transmit command was inputted, and subsequently ends the preview displaying process.

If "Cancel" has been inputted (S430: Cancel), then in S480, the CPU 31 executes a transmission job canceling process for deleting the inputted telephone number and the converted data stored in the memory, and subsequently ends the preview displaying process.

However, if a positive determination is made in S410 (S410: YES), then in S450, the CPU 31 develops the converted data stored in the memory and re-stores the developed data as display data, and subsequently displays a transmission preview on the display unit 30 based on the display data.

Figure 10A:
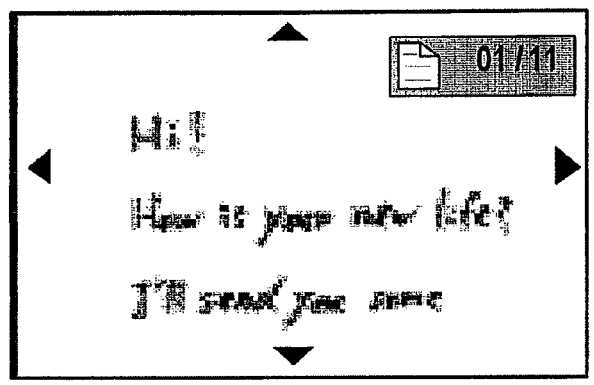
FIG. 10(a) is an explanatory diagram showing an example of a transmission preview.
Figure 10B:
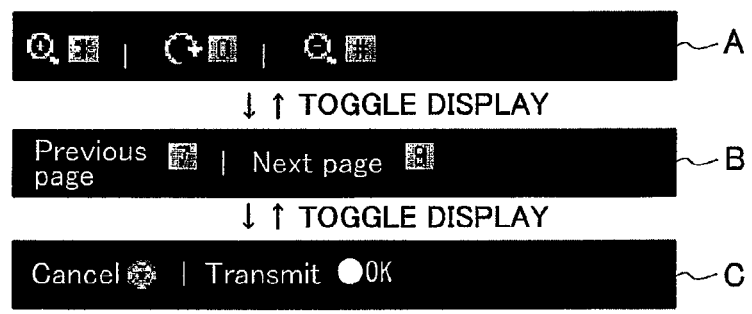
FIG. 10(b) is an explanatory diagram showing a help screen.

FIG. 10(*a*) shows a sample transmission preview. As shown in FIG. 10(*a*), when a preview display is implemented, an image corresponding to the converted data is displayed prior to transmission. Guidance images A to C, such as those shown in FIG. 10(*b*), are also displayed in the bottommost portion of the display unit 30 one at a time. The user can operate the navigation keys 26 to toggle the display of the guidance images A to C. The guidance image A allows the user to increase (assigned the "*" key) or decrease (assigned the "#" key) the size of the image displayed in the preview. The guidance image B allows the user to change the display to the next page (assigned the "9" key) or the previous page (assigned the "7" key) when multiple pages of an original have been read.

The guidance image C is displayed for each page of the scanned original, prompting the user to select "Transmit" (assigned the OK key 27) or "Cancel" (assigned the Cancel key 28).

In S460 of FIG. 9(*a*), the CPU 31 determines whether the user has selected "Transmit" or "Cancel." If neither "Transmit" nor "Cancel" has been selected (S460: NO), then the CPU 31 loops back to S460 and repeats the process until either "Transmit" or "Cancel" has been selected.

If "Transmit" has been selected (S460: Transmit), then in S470, the CPU 31 executes the transmission job setting process mentioned earlier, and ends the preview displaying process.

If "Cancel" has been selected (S460: Cancel), then in S480, the CPU 31 executes the transmission job canceling process mentioned earlier, and ends the preview displaying process.

Returning to FIG. 8, in S340, the CPU 31 references the RAM 33 to determine whether a Transmit command was input during the preview displaying process executed in S330. If so (S340: YES), then in S350, the CPU 31 executes the transmission process to transmit the converted data stored in the memory (the RAM 33), and subsequently ends the preview/transmission process. However, if not (S340: NO), then the CPU 31 simply ends the preview/transmission process.

Next, the transmission job holding process of S440 (FIG. 9(*a*)) will be described. As shown in FIG. 11(*a*), in S510 of the transmission job holding process, the CPU 31 displays a hold menu on the display unit 30.

FIG. 11(*b*) shows a sample of the hold menu. In this embodiment, the hold menu displayed on the display unit 30 enables the user to select a notification method from among "Notify by e-mail attachment," "Notify by e-mail," "Notify by phone," or "Display popup only."

In S520, the CPU 31 determines whether or not a selection has been made in the hold menu based on whether or not the OK key 27 was pressed. If a selection was not made (S520: NO), then the CPU 31 loops back to S520 until a selection has been made. However, if a selection has been made (S520: YES), then the CPU 31 determines which selection in the hold menu was chosen in S530, S560, and S580.

If the "Notify by e-mail attachment" was selected (S530: YES), then in S540, the CPU 31 sets a notification address to an e-mail address stored in advance on the multifunction device 1 (and more specifically in the ROM 32, the EEPROM 34, or other memory). In S550, the CPU 31 attaches the converted data stored in the memory (the RAM 33) for the original read in scan-to-memory process to an e-mail message and transmits the e-mail message to the notification address via the LAN interface 133.

It should be noted that when setting the destination address in S540, it is possible to prompt the user to directly input an e-mail address by operating the navigation keys 26 and the OK key 27, for example. Also, if the flash memory 135 stores data for an e-mail address, this e-mail address may be read from the flash memory 135 and set as the notification address. Further, when attaching the converted data to the e-mail message, it is possible to first convert the converted data to a data format easily developed on the personal computer 2, such as the TIFF or GIF format.

The e-mail message transmitted in the process of S550 is received on the user's personal computer 2 or the like. By developing the attached file with prescribed software, the user can display a preview on the personal computer 2. Accordingly, a preview needs not be displayed on the multifunction device 1 any more when the process of S550 is executed. Also, through operations on the personal computer 2, the user may then issue a command to the multifunction device 1 to transmit the converted data.

Next, in S610, the CPU 31 executes a hold setting by writing data related to the job into the RAM 33. This data may include, for example, the notification method, inputted telephone number, inputted e-mail address, corresponding converted data, and data indicating whether the job is currently on hold (whether the user has quit the preview display). Subsequently, the CPU 31 ends the transmission job holding process.

If "Notify by e-mail" has been selected (S530: NO, S560: YES), then in S570, the CPU 31 performs a process to set a notification address to an e-mail address, similar to the process of S540, and subsequently executes the process in S610 described above.

Further, if "Notify by phone" has been selected (S530: NO, S560: NO, S580: YES), then in S590, the CPU 31 sets the telephone number of the user that has been stored on the multifunction device 1 (in the flash memory 135 or any other memory, such as the RAM 33) in advance as the notification telephone number, and subsequently executes the process in S610 described above.

Figure 13A:
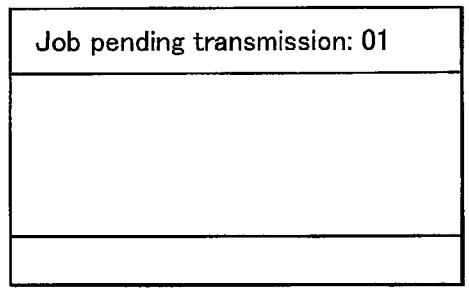
FIG. 13(a) is an explanatory diagram showing a sample display of a message M2.

If "Display popup only" has been selected (S530: NO, S560: NO, S580: NO), then in S600, the CPU 31 displays a message M2, such as that shown in FIG. 13(*a*), on the display unit 30. The message shown in FIG. 13(*a*) displays jobs pending transmission with an ID number ("01" in FIG. 13(*a*)). Then, the CPU 31 executes the process in S610 described above.

Figure 12:
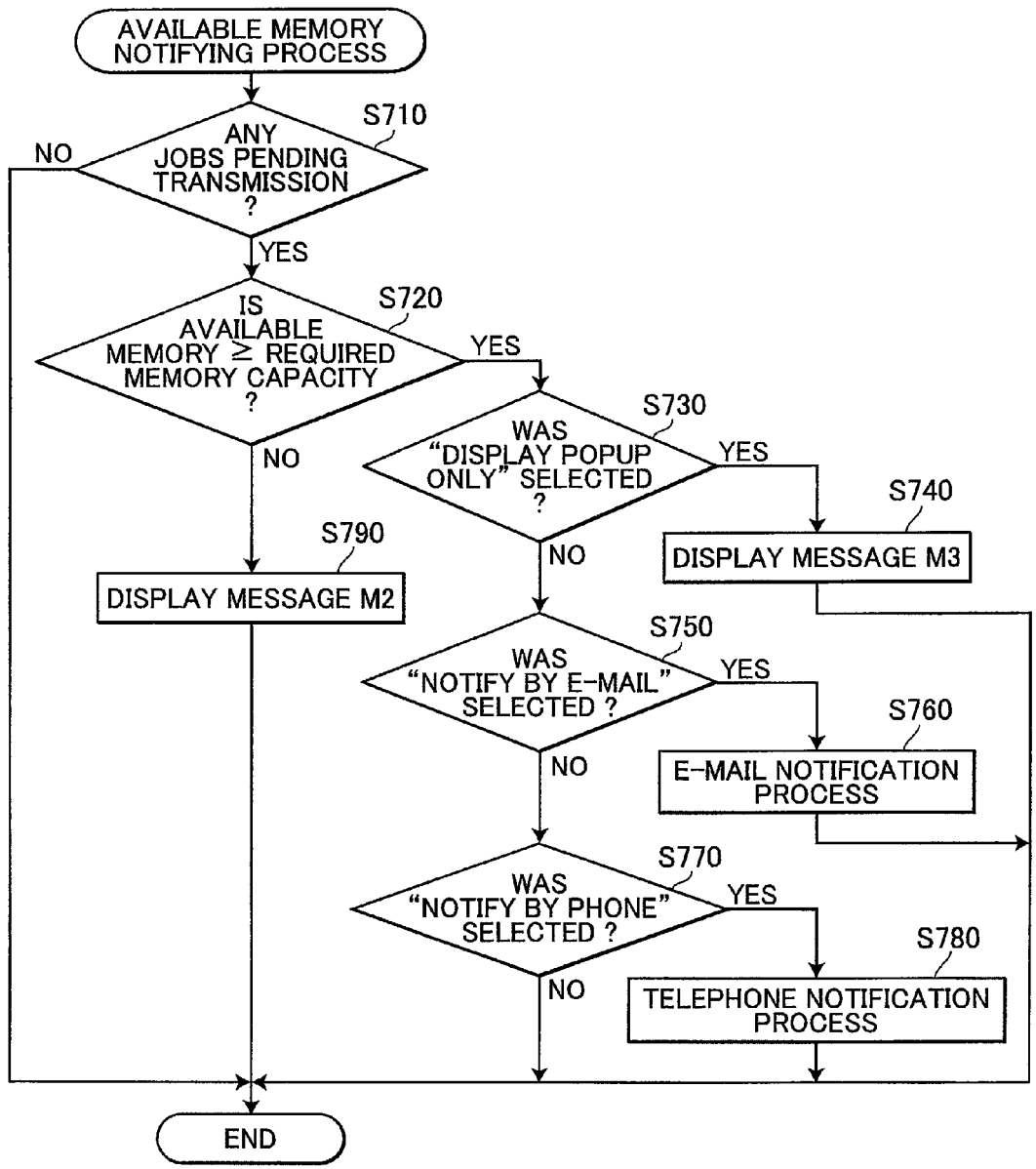
FIG. 12 is a flowchart illustrating steps in an available memory notifying process.

Next, an available memory notifying process will be described with reference to a flowchart shown in FIG. 12. The available memory notifying process is executed periodically (every 5 minutes, for example) by the CPU 31 for notifying the user of the available memory when the memory capacity in the RAM 33 later becomes sufficiently large for displaying a preview.

In S710, the CPU 31 references the RAM 33 to determine whether or not any jobs are pending transmission. If no jobs are pending transmission (S710: NO), the CPU 31 ends the process.

However, if there are jobs pending transmission (S710: YES), then in S720, the CPU 31 determines whether or not the available memory in the RAM 33 is greater than or equal to the memory capacity required for displaying a preview. If the available memory is insufficient (S720: NO), then in S790, the CPU 31 displays (or continues displaying) the message M2 on the display unit 30 indicating a preview cannot be displayed, and ends the process. However, if the available memory is sufficient for displaying a preview (S720: YES), then the CPU 31 determines in S730, S750, and S770 which notification method has been selected in S520 (FIG. 11(a)) by referencing data for the job stored in the RAM 33.

Figure 13B:
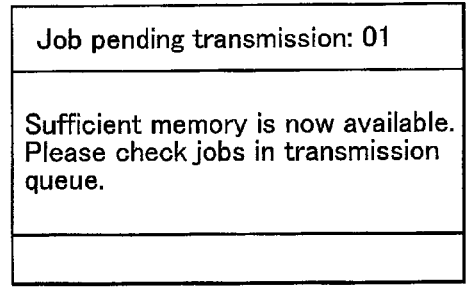
FIG. 13(b) is an explanatory diagram showing a sample display of a message M3.

If "Display popup only" has been selected (S730: YES), then in S740, the CPU 31 displays a message M3 on the display unit 30 and subsequently ends the process. FIG. 13(b) shows a sample of the message M3. In addition to the content in the message M2 described above, the message M3 includes a message indicating that a preview can now be displayed.

On the other hand, if "Notify by e-mail" was selected (S730: NO, S750: YES), then in S760, the CPU 31 executes an e-mail notification process for referencing data for the job stored in the RAM 33 and transmitting an e-mail message including wording similar to that in the message M3 to the e-mail address stored in the RAM 33. Subsequently, the CPU 31 ends the process.

However, "Notify by phone" has been selected (S730: NO, S750: NO, S770: YES), then in S780, the CPU 31 executes a telephone notification process for referencing data on the job stored in the RAM 33, placing a call to the telephone number stored in the RAM 33, and playing a voice notification over the phone with content similar to that in the message M3. The CPU 31 subsequently ends the process.

In this manner, the multifunction device 1 having this construction can notify the user of the available memory capacity according to the most convenient method for the user when a preview can be displayed. Thus, the user needs not remain near the multifunction device 1. Further, this construction prevents the user from forgetting that the scanned data (converted data) is in a pending state.

Figure 14A:
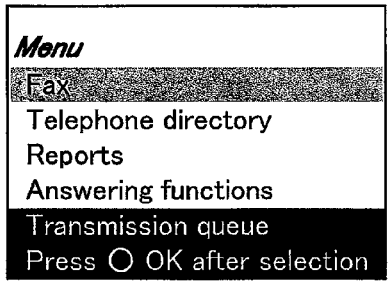
FIG. 14(a) is an explanatory diagram showing a sample display of a menu.
Figure 14B:
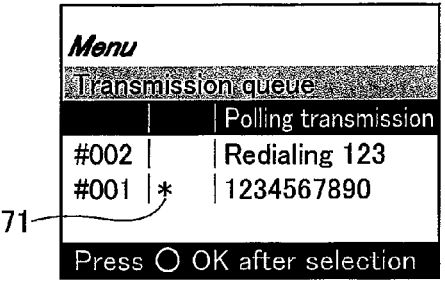
FIG. 14(b) is an explanatory diagram showing a sample display of a job list.

By operating the display switching keys 52 (more specifically, by pressing the menu key 59 to display a function-specific menu for the facsimile function, the scanner function, and the like, selecting the facsimile function, and pressing the OK key 27), the user can display the menu shown in FIG. 14(a) on the multifunction device 1. If the user selects "Transmission queue" and presses the OK key 27, the CPU 31 reads data for jobs stored in the RAM 33 and displays on the display unit 30 this data in a job list as that shown in FIG. 14(b). As shown in FIG. 14(b), a special symbol 71 (a "*" in this example) is displayed next to jobs placed on hold because a preview could not be displayed to distinguish these jobs from other jobs, such as jobs waiting for a redial or jobs to be sent at a specific time. Hence, the user can easily distinguish pending job data for which a preview could not be displayed in the job list.

As described above, the multifunction device 1 according to the first embodiment can display a preview of images of an original read by the scanning unit 19 and can prompt the user to confirm the images prior to transmitting the scanned data to a specified destination. Therefore, if the original was set upside down when the original was scanned, the user can recognize that the original was set incorrectly based on the blank images displayed in the preview, thereby preventing a large amount of data for blank sheets being transmitted accidentally to the recipient. Further, if the scanning unit 19 failed to read the document properly due to abnormalities in the scanning system or the like, the user can prevent transmission of such corrupted data by checking the preview display. By displaying a preview of the data to be actually transmitted, the user can check for any defects in the display to prevent the transmission of defective data, particularly when transmitting data to an important client.

That is, the conventional communication device is not provided with a function allowing the user to confirm transmission data prior to transmission. Therefore, if a problem occurs when scanning an original, this communication device transmits the problematic data to the prescribed destination as is, requiring the data to be retransmitted later. In such a case, the first transmission was ultimately unnecessary, i.e., a wasted transmission. However, the multifunctional device 1 of the embodiment can prevent this problem.

Further, because the multifunction device 1 can display an error message if a preview cannot be displayed due to insufficient available memory in the RAM 33, the multifunction device 1 can notify the user in a clearly understandable manner that the preview could not be displayed.

Since the multifunction device 1 holds (saves) scanned data instead of deleting the data and enables the user to call up this data from a pending job list, the original needs not be rescanned when a preview display could not initially be performed. Accordingly, the multifunction device 1 simplifies the operations performed by the user to transmit scanned data at a later time when the preview could not be displayed.

Further, the multifunction device 1 allows the user to select which process to execute from among the transmission job holding process, the transmission job cancelling process, and the transmission job setting process during the preview displaying process (FIG. 9(a)). Thus, the user can select the most convenient process when scanned data cannot be immediately shown in a preview.

Because the multifunction device 1 displays the message M2 when there exists jobs placed on hold due to insufficient memory capacity, the multifunction device 1 can notify other users of the multifunction device 1 when the multifunction device 1 is unable to display previews.

Further, when the user presses the Preview key 61 during the facsimile process, the CPU 31 executes a process depending on whether the multifunction device 1 is in the preview display/transmission mode or the received image displaying mode. Therefore, the Preview key 61 can be used for multiple purposes, and thus the region in which the Preview key 61 is provided can be used effectively while preventing the user from performing mistaken operations.

Further, the Preview key 61 for inputting a preview transmission command to transmit data after displaying a preview, and the Start key 29 for inputting a preview-less transmission command for transmitting data without displaying a preview are configured of separate keys. In other words, by providing separate keys for selecting method of transmission when the probability of confusion is high, the multifunction device 1 facilitates the user in selecting a desired function without confusing the operation.

Further, in the multifunction device 1, since data for various processes is stored in the RAM 33, the storage area of the RAM 33 can be shared among these processes. Therefore, storage area in the RAM 33 that is freed up when data is deleted can be used as a storage area for other processes, thereby making efficient use of the storage area.

It should be noted that the multifunction device 1 may be provided with a plurality of the display units 30, whereby messages, warning lamps, and the like can be displayed on different display units 30 for each notification.

Second Embodiment

Figure 15:
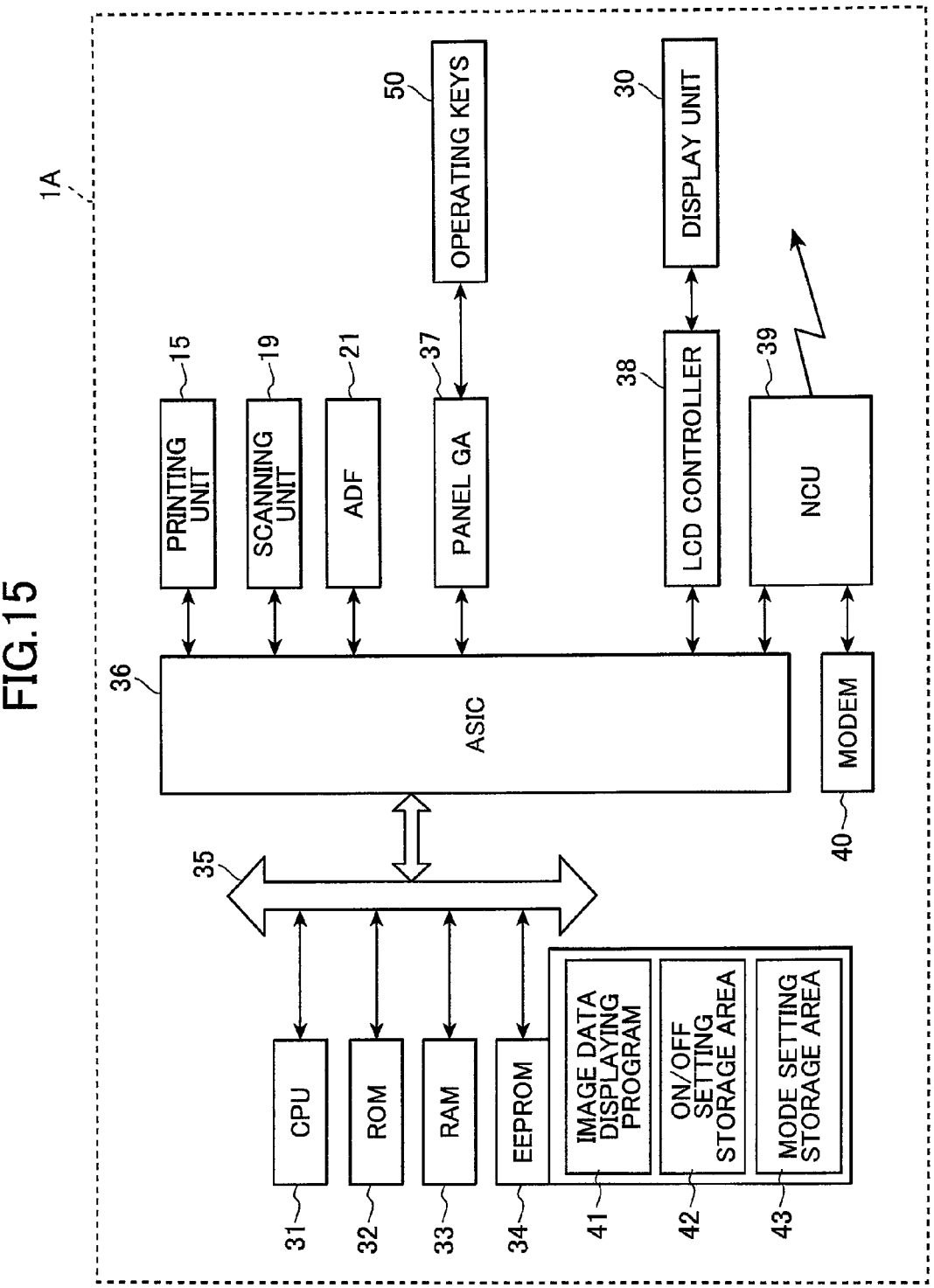
FIG. 15 is a block diagram showing the electrical structure of a multifunction device according to a second embodiment of the invention.

Next, a second embodiment of the invention will be described, wherein like parts and component are designated with the same reference numerals to avoid duplicating description. FIG. 15 is a block diagram showing the electrical structure of a multifunction device 1A according to the second embodiment.

The operations of the multifunction device 1A are controlled by a computer that includes the ROM 32, the RAM 33, and the EEPROM 34 that are all electrically connected to the CPU 31 via a bus 35.

The EEPROM 34 stores an image data displaying program 41 described in greater detail below. The EEPROM 34 also includes an ON/OFF setting storage area 42 and a mode setting storage area 43.

The ON/OFF setting storage area 42 stores ON/OFF setting of a fax transmission preview mode indicating whether or not to display a preview image for an original scanned for a fax transmission. The ON/OFF setting storage area 42 stores an ON setting when a preview is to be displayed and an OFF setting when the preview is not to be displayed.

The mode setting storage area 43 stores mode setting indicating whether the preview mode is set to a first mode or a second mode. In the first mode, image data for an original is displayed on the display unit 30 after the image reading unit 12 has scanned the entire document. In the second mode, image data for an original is displayed on the display unit 30 after the image reading unit 12 scans each page.

The bus 35 is also electrically connected to an application specific integrated circuit (ASIC) 36, enabling signals to be exchanged with electronic components constituting the multifunction device 1A.

The ASIC 36 is also connected to the printing unit 15, the scanning unit 19, the ADF 21, a panel GA 37, an LCD controller 38, and the NCU 39.

The panel GA 37 is connected to the operating keys 50 for acquiring data inputted via the control panel 23. The LCD controller 38 controls the display process on the display unit 30.

Next, operations of the multifunction device 1A will be described. In this example, the multifunction device 1A will transmit a 10-page original by fax to the facsimile device 5 shown in FIG. 1.

Figure 16:
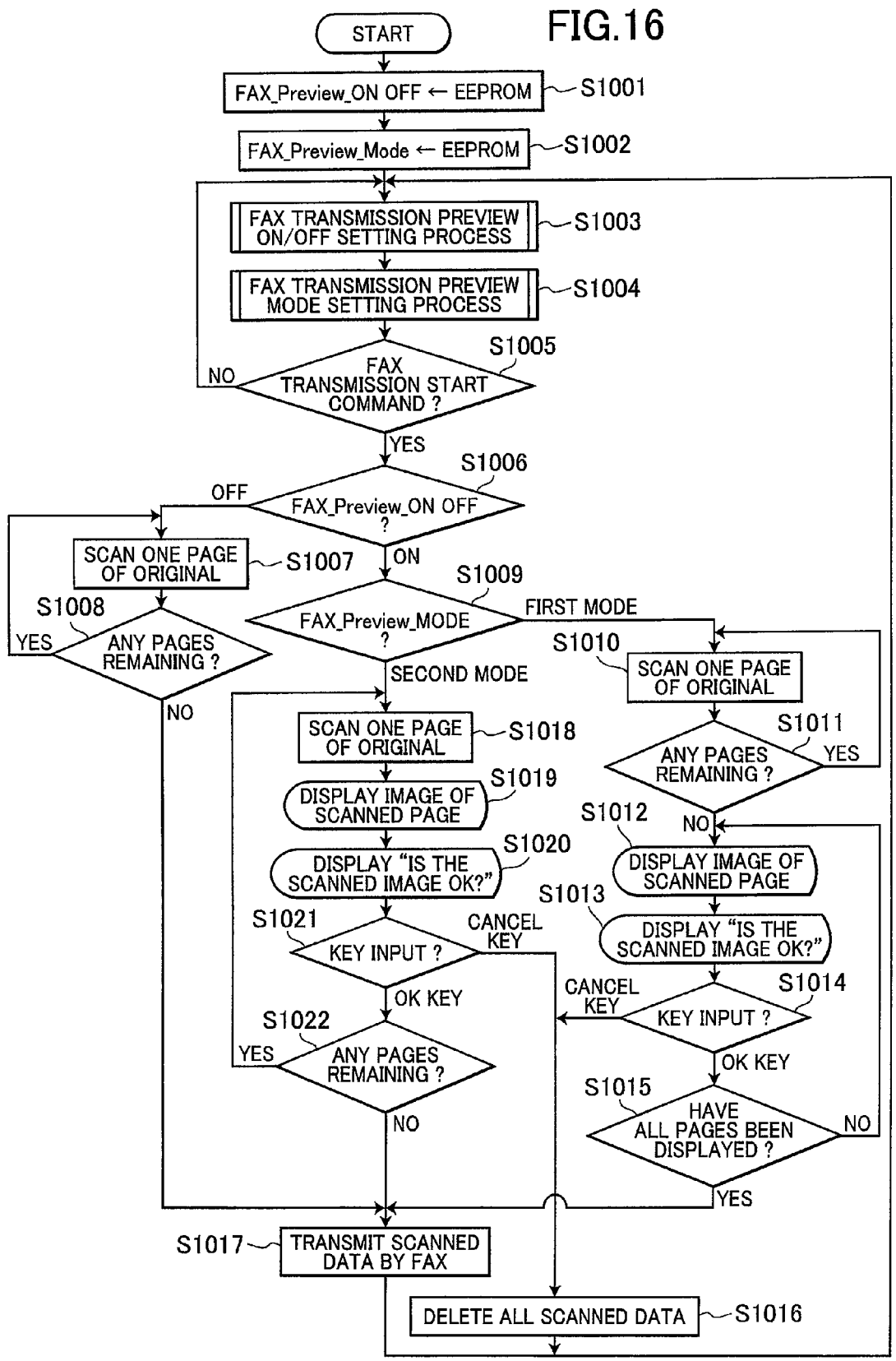
FIG. 16 is a flowchart illustrating steps in an image data displaying process according to the second embodiment of the invention.

FIG. 16 is a flowchart illustrating steps in an image data displaying process that the CPU 31 executes according to the image data displaying program 41. In the image data displaying process, all image data read from an original is discarded when the user determines that a problem occurred when scanning the original, prompting the user to rescan the original from the beginning.

Specifically, when the power of the multifunction device 1A is switched ON, the CPU 31 reads the image data displaying program 41 from the EEPROM 34 and executes the image data displaying process. In S1001 of the image data displaying process, the CPU 31 reads the ON/OFF setting stored in the ON/OFF setting storage area 42 of the EEPROM 34 and stores this setting at an address FAX_Preview_ON OFF of the RAM 33. In S1002, the CPU 31 reads the mode setting stored in the mode setting storage area 43 of the EEPROM 34 and stores this mode setting at an address FAX_Preview_Mode of the RAM 33.

The processes in S1001 and S1002 are performed to determine whether a preview of the fax original was to be displayed when the multifunction device 1A was previously switched OFF and, if so, whether the fax transmission preview mode was set to the first mode or the second mode. This process eliminates an idle period during which there is no setting for the preview display.

In S1003, the CPU 31 executes a fax transmission preview ON/OFF setting process for enabling the user to freely change the ON/OFF setting of the fax transmission preview mode. The fax transmission preview ON/OFF setting process will be described in detail with reference to a flowchart shown in FIG. 17.

Figure 17:
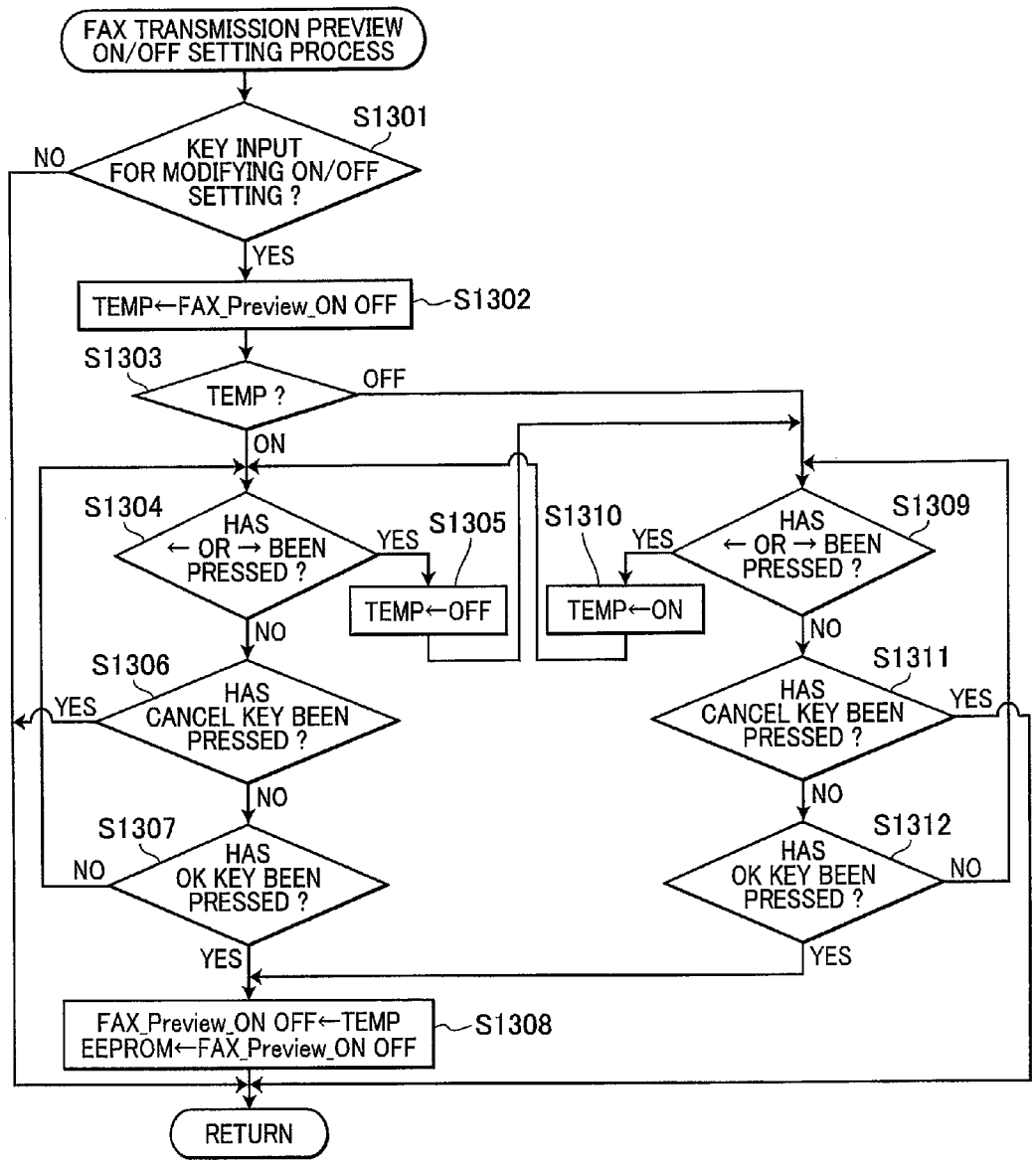
FIG. 17 is a flowchart illustrating steps in a fax transmission preview ON/OFF setting process executed in S1003 of FIG. 16.

In S1301 of FIG. 17, the CPU 31 determines whether a command for changing the fax transmission preview ON/OFF setting has been inputted. For example, when the user selects the facsimile function by pressing the corresponding function switching key 25, the multifunction device 1A displays on he display unit 30 a fax transmission menu including the option "Set fax transmission preview ON/OFF." Hence, in S1301, the CPU 31 determines whether the user has selected the option "Set fax transmission preview ON/OFF" with the navigation keys 26.

If a negative determination was made in S1301 (S1301: NO), indicating that the user is satisfied with the current setting, then the CPU 31 advances to S1004 of FIG. 16 with no further action.

However, if a positive determination was made in S1301 (S1301: YES), indicating that the user would like to change the current setting, then the CPU 31 advances to S1302.

In S1302, the CPU 31 temporarily stores at an address TEMP of the RAM 33 the ON/OFF setting currently stored at the address FAX_Preview_ON OFF. In S1303, the CPU 31 determines whether the setting stored at the address FAX-_Preview_ON OFF of the RAM 33 is the ON setting or the OFF setting.

If the current setting is the ON setting (S1303: ON), then in S1304, the CPU 31 notifies the user of this setting by displaying the ON setting and the OFF setting juxtaposed left and right on the display unit 30 and displaying the cursor under the ON setting, and also determines whether or not the user has operated the navigation keys 26 for the left or right direction.

If the user has operated the navigation keys 26 in the left or right direction (S1304: YES), then it is considered that the user wishes to switch the fax transmission preview mode from the ON setting to the OFF setting, and that the cursor is moved from the ON setting to the OFF setting on the display unit 30. In S1305, the CPU 31 changes the ON/OFF setting stored at the address TEMP of the RAM 33 from the ON setting to the OFF setting, and advances to S1309 described later.

However, if the user has not operated the navigation keys 26 (S1304: NO), the position of the cursor displayed on the display unit 30 is still aligned with the ON setting. Then, in S1306, the CPU 31 determines whether the user has pressed the Cancel key 28.

If the user has pressed the Cancel key 28 (S1306: YES), indicating that the user no longer wishes to modify the ON/OFF setting, the CPU 31 advances to S1004 of FIG. 16 with no further action.

However, if the user has not pressed the Cancel key 28 (S1306: NO), then in S1307, the CPU 31 determines whether the user has pressed the OK key 27.

If the OK key 27 has not been pressed (S1307: NO), then the user may still change the ON/OFF setting and, hence, the CPU 31 returns to S1304.

However, if the OK key 27 has been pressed (S1307: YES), indicating that the user has settled on the ON setting, then in S1308, the CPU 31 overwrites the setting at the address FAX_Preview_ON OFF of the RAM 33 with the setting that is currently stored at the address TEMP of the RAM 33 (ON setting, in this case), and then overwrites the setting stored in the ON/OFF setting storage area 42 with the setting that is stored at the address FAX_Preview_ON OFF (ON setting, in this case). Subsequently, the CPU 31 advances to S1004 of FIG. 16.

On the other hand, if the CPU 31 determined in S1303 that the ON/OFF setting stored at the address FAX_Preview_ON OFF of the RAM 33 is the OFF setting (S1303: OFF), then the process from S1309 is performed. Since this process is similar to the process of S1304-S1308, only a brief description will be given.

A confirmation message is displayed on the display unit 30 indicating that the current setting is the OFF setting and prompting the user to confirm whether to change the ON/OFF setting. If the user moves the position of the cursor displayed on the display unit 30 from the OFF setting to the ON setting using the navigation keys 26 (S1309: YES), then in S1310, the CPU 31 changes the OFF setting stored at the address TEMP of the RAM 33 to the ON setting and advances to S1304.

However, if the navigation keys 26 were not operated (S1309: NO), then the CPU 31 determines in S1311 whether or not the user has pressed the cancel key 28 and, in S1312, determines whether or not the user has pressed the OK key 27. If the user has selected to switch to (or maintain) the OFF setting (S1311: NO, S1312: YES), then in S1308, the CPU 31 overwrites the setting stored at the address FAX_Preview_ON OFF of the RAM 33 with the ON/OFF setting currently stored at the address TEMP of the RAM 33 (OFF setting, in this case), and then overwrites the setting stored in the ON/OFF setting storage area 42 with the ON/OFF setting stored at the address FAX_Preview_ON OFF of the RAM 33 (OFF setting, in this case). Then, the CPU 31 advances to S1004 of FIG. 16.

In S1004 of FIG. 16, the CPU 31 performs a fax transmission preview mode setting process for enabling the user to select the first mode or the second mode of the fax transmission preview mode. The fax transmission preview mode setting process will be described in detail with reference to a flowchart of FIG. 18.

Figure 18:
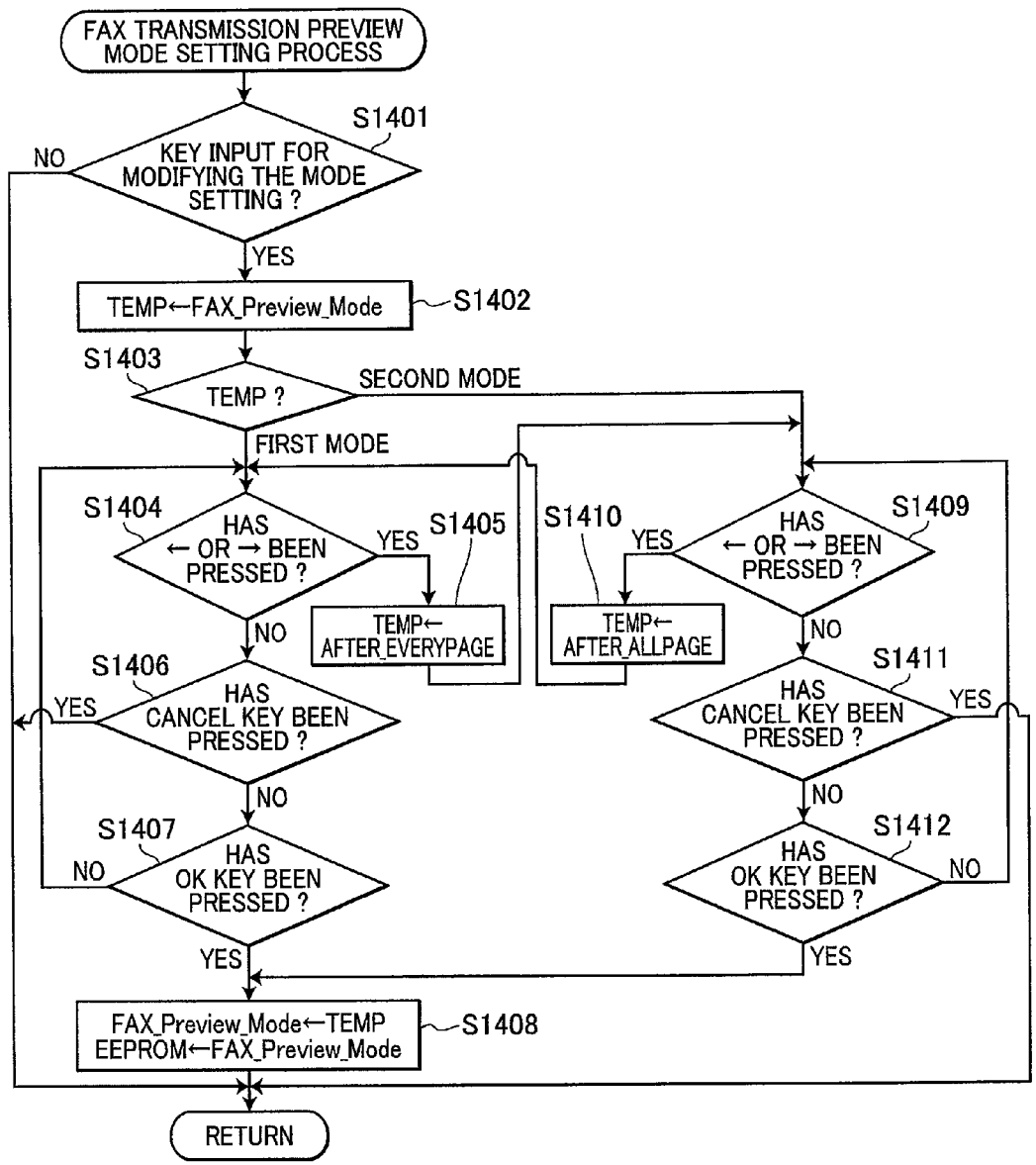
FIG. 18 is a flowchart illustrating steps in a fax transmission preview mode setting process executed in S1004 of FIG. 16.

In S1401 of FIG. 18, the CPU 31 determines whether or not the user has inputted an instruction to change the mode setting. For example, when the user selects the fax function by operating the corresponding function switching key 25, the fax transmission menu is displayed with the option "Change setting of fax transmission preview mode." Hence, the CPU 31 determines in S1401 whether or not the user has selected the option "Change setting of fax transmission preview mode," by operating the navigation keys 26. If a negative determination was made in S1401 (S1401: NO), then the current setting need not be changed, and the CPU 31 advances to S1005 of FIG. 16 with no further action.

However, if a positive determination was made in S1401 (S1401: YES), then in S1402, the CPU 31 temporarily stores at the address TEMP of the RAM 33 the mode setting currently stored at the address FAX_Preview$_{13}$ Mode of the RAM 33. In S1403, the CPU 31 determines whether the mode setting stored at the address TEMP of the RAM 33 is the first mode or the second mode.

If the CPU 31 determines that the mode setting stored at the address TEMP of the RAM 33 is the first mode (S1403: first mode), then in S1404, the CPU 31 notifies the user that the current mode setting is the first mode by displaying "First mode" and "Second mode" on the display unit 30 side by side and displaying the cursor at the position of the first mode, and determines whether or not the user has changed the mode setting by operating the navigation keys 26.

For example, when the user operates the navigation keys 26 to move the cursor displayed in the display unit 30 from the first mode to the second mode (S1404: YES), then in S1405, the CPU 31 overwrites the mode setting stored at the address TEMP of the RAM 33 with the second mode and advances to S1409 described later.

However, if the user does not operate the navigation keys 26 (S1404: NO), then in S1406, the CPU 31 determines whether the Cancel key 28 was pressed to cancel the fax transmission preview mode setting process. If the user pressed the Cancel key 28 (S1406: YES), then the CPU 31 advances to S1005 in FIG. 16 with no further action.

However, if the user did not press the Cancel key 28 (S1406: NO), then in S1407, the CPU 31 determines whether or not the OK key 27 was pressed. If not (S1407: NO), then the CPU 31 returns to S1404 since there remains the possibility that the user will change the mode.

However, if the OK key 27 was pressed (S1407: YES), then in S1408, the CPU 31 overwrites the mode setting at the address FAX_Preview_Mode with the mode setting currently stored at the address TEMP (first mode in this case), and then overwrites the mode setting in the mode setting storage area 43 with the mode setting stored at the address FAX_Preview_Mode (first mode in this case). Then, the CPU 31 advances to S1005 of FIG. 16.

On the other hand, if the CPU 31 determines in S1403 that the mode setting stored at the address TEMP of the RAM 33 is the second mode (S1403: second mode), then in S1409, the CPU 31 indicates in the display unit 30 that the second mode is the current setting for the fax transmission preview mode and determines whether or not the navigation keys 26 have been operated. If so (S1409: YES), then in S1410, the CPU 31 overwrites the mode setting stored at the address TEMP of the RAM 33 with the first mode and returns to S1404 described above.

However, if the user did not operate the navigation keys 26 (S1409: NO), then in S1411, the CPU 31 determines whether or not the user has pressed the Cancel key 28. If not (S1411: NO), then in S1412, the CPU 31 determines whether or not the OK key 27 has been pressed by the user. If so (S1412: YES), then in S1408, the CPU 31 overwrites the mode setting at the address FAX_Preview_Mode of the RAM 33 with the mode setting currently stored at the address TEMP of the RAM 33 (second mode in this case), and then overwrites the mode setting in the mode setting storage area 43 with the mode setting stored at the address FAX_Preview_Mode (second mode in this case). Subsequently, the CPU 31 advances to S1005 of FIG. 16.

In S1005 of FIG. 16, the CPU 31 determines whether or not a fax transmission start command has been inputted by the user by pressing the Start key 29. If not (S1005: NO), then the CPU 31 returns to S1003. However, if so (S1005: YES), then the CPU 31 advances to S1006 to begin operations for scanning the original and transmitting the fax.

Therefore, the process in S1003-S1005 described above enables the user, while the multifunction device 1A is in standby, to freely set whether or not to view a preview display on the display unit 30 prior to transmitting data scanned for an original in a fax transmission and, if displaying a preview, whether to display the preview according to the first mode or the second mode. In other words, the person transmitting the fax can choose desired settings for displaying a preview of a scanned original to be transmitted by facsimile.

In S1006 of FIG. 16, the CPU 31 determines whether the ON/OFF setting at the address FAX_Preview_ON OFF of the RAM 33 is the ON setting or the OFF setting. If the ON/OFF setting at the address FAX_Preview_ON OFF of the RAM 33 is the OFF setting (S1006: OFF), indicating that it is not necessary to display a preview of the scanned original, then the CPU 31 scans the entire original in S1007 and S1008 and advances to S1017 to transmit a fax of the scanned data. Subsequently, the CPU 31 returns to S1003 and enters the standby state.

On the other hand, if the ON/OFF setting at the address FAX_Preview_ON OFF of the RAM 33 is the ON setting (S1006: ON), then in S1009, the CPU 31 determines whether the mode setting at the address FAX_Preview_Mode of the RAM 33 is the first mode or the second mode.

When the mode setting is the first mode (S1009: first mode), then all pages of the original are scanned, after which the user is prompted to confirm the scanned image one page at a time.

Specifically, in S1010, the CPU 31 scans one page of the original and stores the scanned image data into the RAM 33. In S1011, the CPU 31 determines whether or not another page exists. If another page exists (S1011: YES), then the CPU 31 returns to S1010 and reads the next page of the original. When successive pages of the original no longer exist (S1011: NO), then the CPU 31 advances to S1012. Hence, the CPU 31 scans all pages of the original in S1010 and S1011.

The original may be scanned according to a method using the ADF 21, for example. Specifically, if the user places 10 sheets of an original in the document tray 22 and presses the Start key 29, the ADF 21 automatically conveys the topmost sheet of the original over the platen glass 18 one sheet at a time. The scanning unit 19 scans the original in synchronization with the timing at which the sheets are conveyed. The CPU 31 of the multifunction device 1A determines that successive pages no longer exist when sheets of the original are no longer set in the document tray 22.

Another method for scanning the original is to scan each sheet of the original manually. Specifically, the user opens the document cover 20 and places one sheet of the original on the platen glass 18. Subsequently, the user closes the document cover 20 and presses the Start key 29, sending an instruction to the multifunction device 1A to begin scanning the original. At this time, the scanning unit 19 is activated and reads one sheet worth of an image on the original placed on the platen glass 18. Next, the user opens the document cover 20 and replaces the first sheet with a second sheet of the original. The user again closes the document cover 20 and presses the Start key 29, and the scanning unit 19 reads the second sheet. After repeating this procedure until 10 sheets of the original have been scanned, the user presses the OK key 27, at which point the multifunction device 1A determines that successive sheets of the original do not exist.

Once the CPU 31 determines that the entire original has been scanned and no successive sheets exist (S1011: NO), in S1012, the CPU 31 displays image data for the first page of the scanned original on the display unit 30. In S1013, the CPU 31 displays the confirmation message "Is the scanned image OK?" on the display unit 30. In S1014, the CPU 31 determines whether the user has pressed the OK key 27 or the Cancel key 28. The processes of S1013 and S1014 function to display the scanned image for each sheet on the display unit 30 and prompt the user to confirm the scanned state of each.

The user may press the Cancel key 28 (S1014: Cancel key) when the order of the sheets displayed on the display unit 30 is incorrect, for example. At this time, the CPU 31 recognizes that a scanning problem occurred and, in S1016, deletes all image data scanned in S1010. Subsequently, the CPU 31 returns to S1003 and enters the standby state.

However, if the user views the image displayed on the display unit 30 and confirms that the original was read correctly by pressing the OK key 27 (S1014: OK key), then in S1015, the CPU 31 determines whether or not all sheets of the image scanned in S1010 have been displayed. If any of the scanned sheets have not been displayed (S1015: NO), then the CPU 31 returns to S1012 and displays image data for the next sheet of the original on the display unit 30, prompting the user to confirm the scanned state.

When the CPU 31 determines in S1015 that all scanned sheets have been displayed (S1015: YES), indicating that the user has confirmed the scanned state of the entire original to be satisfactory, and in S1017, the CPU 31 transmits the scanned original by fax to the destination facsimile device 5. Subsequently, the CPU 31 returns to S1003 and enters the standby state.

Hence, the processes in S1012-S1015 are performed for prompting the user to confirm the scanned state of the original and to determine whether or not to transmit the scanned original.

On the other hand, when the CPU 31 determines in S1009 that the mode setting at the address FAX_Preview_Mode of the RAM 33 is the second mode (S1009: second mode), then the CPU 31 displays the scanned original on the display unit 30 after each sheet of the original is scanned, prompting the user to confirm the state of each sheet.

More specifically, in S1018, the CPU 31 scans one sheet of the original and stores the scanned image data into the RAM 33. In S1019, the CPU 31 displays the image for the page of the original scanned in S1018 on the display unit 30. In S1020, the CPU 31 displays the confirmation message "Is the scanned image OK?" on the display unit 30. In S1021, the CPU 31 determines whether the OK key 27 or the Cancel key 28 has been pressed. The process in S1019-S1021 is performed to prompt the user to confirm the scanned state of the original. If the CPU 31 determines that the Cancel key 28 was pressed (S1021: Cancel key), then the CPU 31 advances to S1016 and deletes the image data for the original scanned to that point. Subsequently, the CPU 31 returns to S1003 and enters the standby state.

However, if the CPU 31 determines that the OK key 27 was pressed (S1021: OK key), then in S1022, the CPU 31 determines whether successive pages exist. If successive pages do exist (S1022: YES), then the CPU 31 returns to S1018 to scan the next sheet of the original. However, when the CPU 31 determines that successive sheets do not exist (S1022: NO), then in S1017, the CPU 31 transmits the scanned image data for the original by fax to the destination facsimile device 5. In other words, the CPU 31 transmits the fax once the scanned state of the entire original has been confirmed to be satisfactory. Subsequently, the CPU 31 returns to S1003 and enters the standby state.

Hence, if the original is scanned automatically using the ADF 21, when the second mode has been selected, the CPU 31 temporarily halts the ADF 21 after each sheet of the original has been conveyed from the document tray 22 to the platen glass 18 and prompts the user to confirm the image scanned by the scanning unit 19. After the user presses the OK key 27, the CPU 31 cancels the paused state of the ADF 21 so that the ADF 21 can convey the next sheet of the original to the platen glass 18. If the user presses the Cancel key 28 before the ADF 21 has conveyed all sheets of the original from the document tray 22, the CPU 31 deletes all image data read from the original to that point and returns to the standby state. However, if all sheets of the original set in the document tray 22 are scanned and the user presses the OK key 27 for the scanned image of the final sheet, the CPU 31 transmits the scanned original as a fax.

If the user scans the original manually while the second mode has been selected, a sheet of the original is scanned when the user presses the Start key 29 and the scanned image is displayed on the display unit 30. If the user presses the cancel key 28 after viewing the image on the display unit 30, the CPU 31 deletes all image data scanned from the original to that point and returns to the standby state. However, if all sheets of the original are scanned with the user pressing the OK key 27 for each sheet, the CPU 31 subsequently transmits the scanned original as a fax.

Therefore, the multifunction device 1A according to the second embodiment enables the user to modify the method in which image data for the original is displayed on the display unit 30 by switching between the first mode and the second mode, thereby improving user-friendliness.

More specifically, the first mode is selected if the user wishes to retrieve the original immediately or wishes to confirm all images to be transmitted by fax at one time. In this case, the user confirms image data for each sheet of the original after the entire original has been scanned, thereby enabling the user to retrieve all 10 pages of the original immediately. This method saves the user the trouble of scanning one sheet of the original, confirming image data for that sheet, and subsequently scanning the next sheet.

On the other hand, the user may select the second mode if there are a large number of sheets in the original to be faxed and the user wishes to quickly catch any scanning irregularities, such as mistakes in page order or page omissions. Since the user confirms the scanned state of the original after each page is scanned in this case, the user can cancel the scanning operation and rescan any pages as soon as a scanning problem is discovered. Accordingly, the second mode allows the user to catch scanning problems early and avoid wasting scanning time.

As described above, the user can select the first mode or the second mode that is most appropriate for the user when using the preview mode, thereby improving user-friendliness. In addition, the time required to check over image data may differ according to the person. However, since the multifunction device 1A according to the second embodiment switches between images of each page sequentially based on the timing at which the user presses the OK key 27, the user is less likely to miss problems in the scanning state than when the image data for each page of the original is displayed at the speed in which the original is scanned, thereby reducing the load on the user.

Further, with the multifunction device 1A, image data for the next page of the original is automatically displayed on the display unit 30 after the user confirms the scanned state of the current page and presses the OK key 27. Hence, operability of the multifunction device 1A is improved over conventional methods requiring the user to perform an operation to display image data for each sheet of the original on the display unit 30 after each sheet is scanned.

Further, the multifunction device 1A displays image data corresponding to the scanned original on the display unit 30 each time the image-reading unit 12 scans one sheet of the original when the second mode has been selected. Accordingly, the user can reliably check the scanned state of the original one sheet at a time when the original includes numerous sheets.

Further, if the user determines that the image data displayed on the display unit 30 is inadequate and presses the Cancel key 28, the multifunction device 1A discards all image data read from the original including the image data determined to be inadequate. Accordingly, the multifunction device 1A can ensure a satisfactory scanning quality.

Conventionally, it has not been possible to know the scanned state of an original until the data was received at the destination. However, since the multifunction device 1A of the embodiment only transmits the fax when the user confirms that the scanned state of the original is adequate prior to transmitting the fax, the data received at the destination is of a satisfactory state. Accordingly, the multifunction device 1A can reduce errors in transmitting an original.

Third Embodiment

Figure 19:
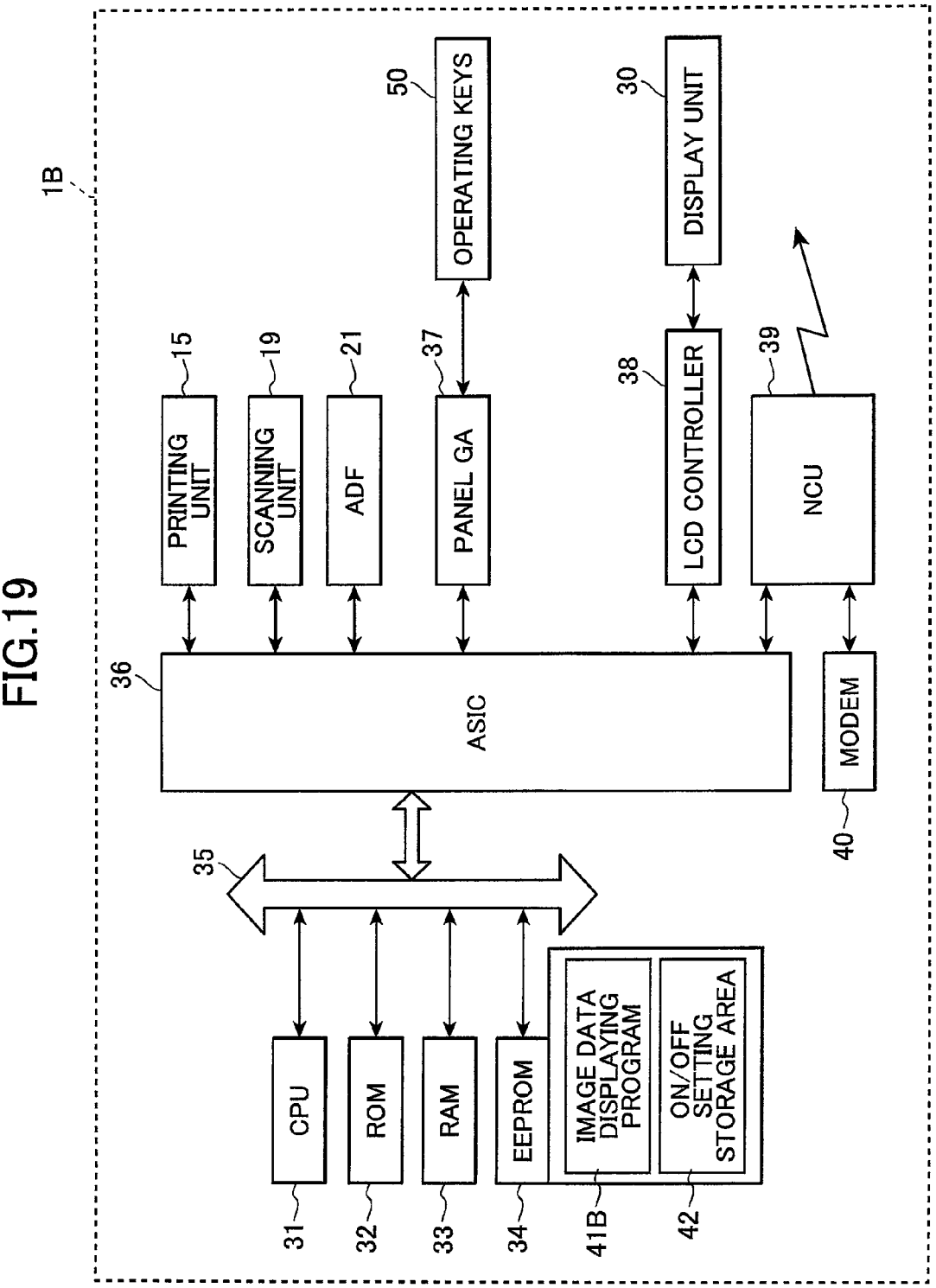
FIG. 19 a block diagram showing the electrical structure of a multifunction device according to a third embodiment of the invention.

Next, a third embodiment of the invention will be described. FIG. 19 is a block diagram showing the electrical structure of a multifunction device 1B according to the third embodiment. The multifunction device 1B is the same as the above-described multifunction device 1A, but differs in that an image data displaying program 41B is stored in the EEPROM 41 rather than the image data displaying program 41, and also in that the mode setting storage area 43 in the EEPROM 34 is omitted. The image data displaying program 41B is configured to display scanned image data after each page of the original is scanned as in the second mode of the above-described second embodiment, and when a scanning problem is discovered, an image of the original is rescanned, and data for the scanned sheet in which the problem was discovered is replaced with the rescanned image data.

Figure 20:
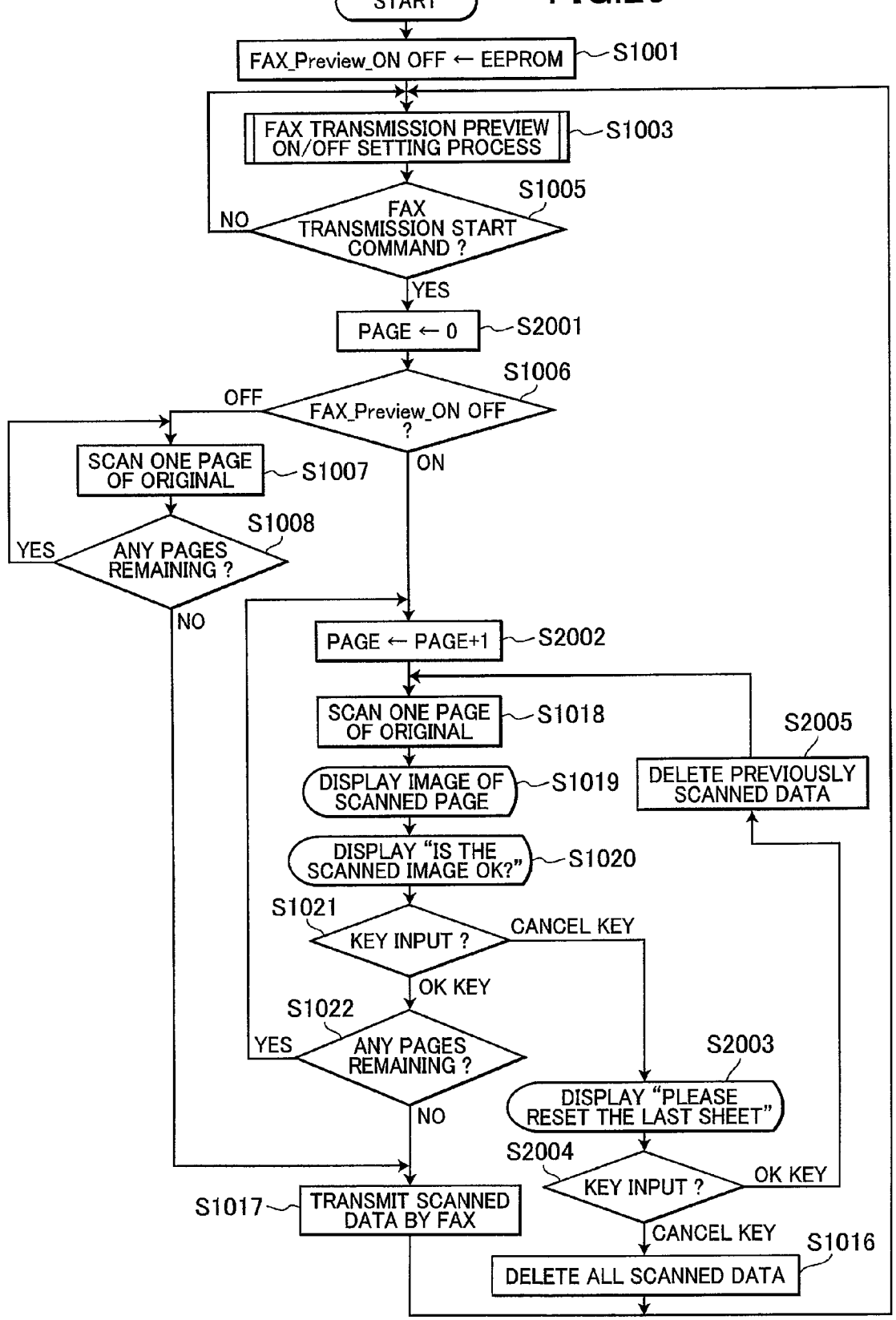
FIG. 20 is a flowchart illustrating steps in an image data displaying process according to the third embodiment of the invention.

FIG. 20 is a flowchart illustrating steps in an image data displaying process executed according to the image data displaying program 41B using the multifunction device 1B according to the third embodiment. Note that the following description will focus on only points that differ from the second embodiment, while points shared by both embodiments are designated with the same reference numerals in the drawings and specification to avoid duplicating description.

As shown in FIG. 20, the CPU 31 first executes the above-described processes of S1001, S1003, and S1005. When the fax transmission start command has been issued (S1005: YES), then in S2001, the CPU 31 initializes a page counter PAGE to 0. If the ON setting is stored at the address FAX_Preview_ON OFF of the RAM 33 (S1006: ON), then in S2002, the CPU 31 increments the page counter PAGE by 1. In S1018-S1020, the CPU 31 scans one page of the original, displays a preview of the scanned image on the display unit 30, and prompts the user to confirm the image. If the user determines that the scanned state of the original displayed in the preview is appropriate in S1021 (S1021: OK key), and if the CPU 31 determines in S1022 that successive pages of the original exist (S1022: YES), then the CPU 31 returns to S2002 and increments the page counter PAGE by 1, confirming that a second page of the original will be read. The original to be transmitted by fax is read completely by repeating the process in S2002 and S1018-S1022.

While scanning the original, problems may occur. For example, the order of the sheets in the original may be incorrect or the sheets may be skewed during the scanning operation. If the user discovers such problems when checking the images on the display unit 30, the user presses the Cancel key 28 at that time (S1021: Cancel key). Consequently, in S2003, the CPU 31 displays a message on the display unit 30, such as "Please reset the last sheet" and in S2004, waits for key input from the user, thereby prompting the user to determine whether to rescan the original.

In order to rescan the last sheet of the original, the user resets the sheet in the document tray 22 or places the sheet on the platen glass 18 and presses the OK key 27 (S2004: OK key). In S2005, the CPU 31 deletes the previously scanned image data and returns to S1018. Subsequently, the sheet of the original in which the problem occurred is rescanned in the process from S1018, and the user is prompted to check the rescanned image as described in S1019, S1020, and S1021.

If the scanned state of the rescanned image is satisfactory (S1021: OK key), then the CPU 31 advances to S1022. However, if the scanned quality of the rescanned original is still bad (S1021: Cancel key), then the CPU 31 advances to S2003 to prompt the user to perform another rescan. In this manner, the user can again reset the document and repeat the process from S2005 and can perform this rescan as many times as necessary.

If the user presses in S2004 the Cancel key 28 to cancel the scanning process (S2004: Cancel key), then in S1016, the CPU 31 deletes all image data for the original scanned to that point. Subsequently, the CPU 31 returns to S1003 and waits.

Hence, the multifunction device 1B according to the third embodiment prompts the user to confirm the scanned state of the original after each page is scanned. If a problem occurs in the scanning process, only problematic pages of the original are rescanned. Accordingly, the user can rescan a sheet of the original the moment a problem occurs, thereby improving operability.

Fourth Embodiment

Figure 21:
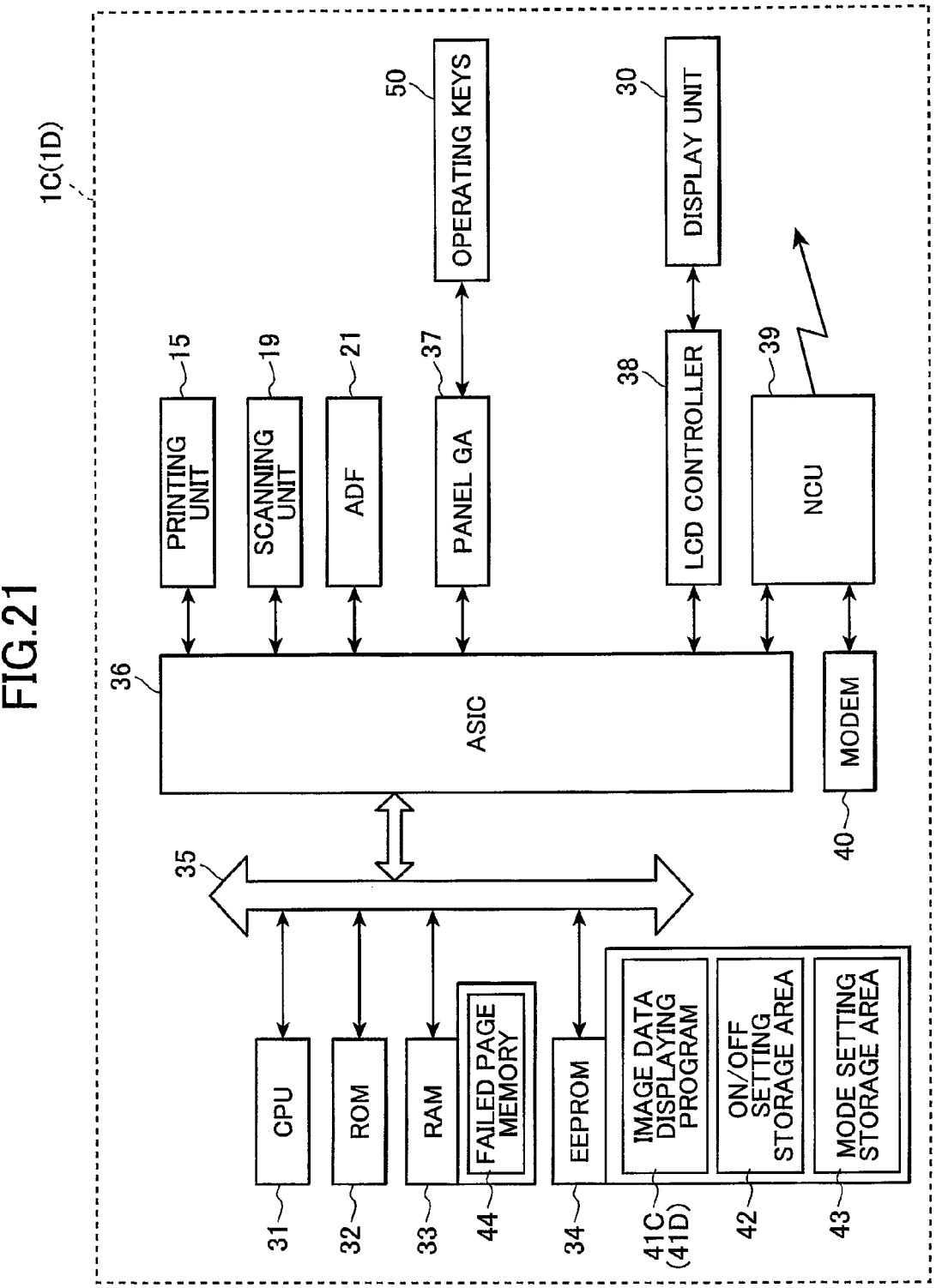
FIG. 21 is a block diagram showing the electrical structure of a multifunction device according to a fourth embodiment of the invention.

Next, a fourth embodiment of the invention will be described. FIG. 21 is a block diagram showing the electrical structure of a multifunction device 1C according to the fourth embodiment. The multifunction device 1C differs from the multifunction device 1A in that the RAM 33 of the multifunction device 1C includes a failed page memory 44, and in that the EEPROM 34 stores an image data displaying program 41C rather than the image data displaying program 41.

The failed page memory 44 has a plurality of addresses and stores a page number of an original in which a scanning problem occurred at each individual address. The number of addresses should be at least equivalent to the number of pages that can be processed on the multifunction device 1C. In this embodiment, the failed page memory 44 is provided with addresses 0-99 capable of supporting 100 pages worth of an original.

The image data displaying program 41C is configured to replacing image data in which a scanning problem has occurred with rescanned image data.

Figure 22:
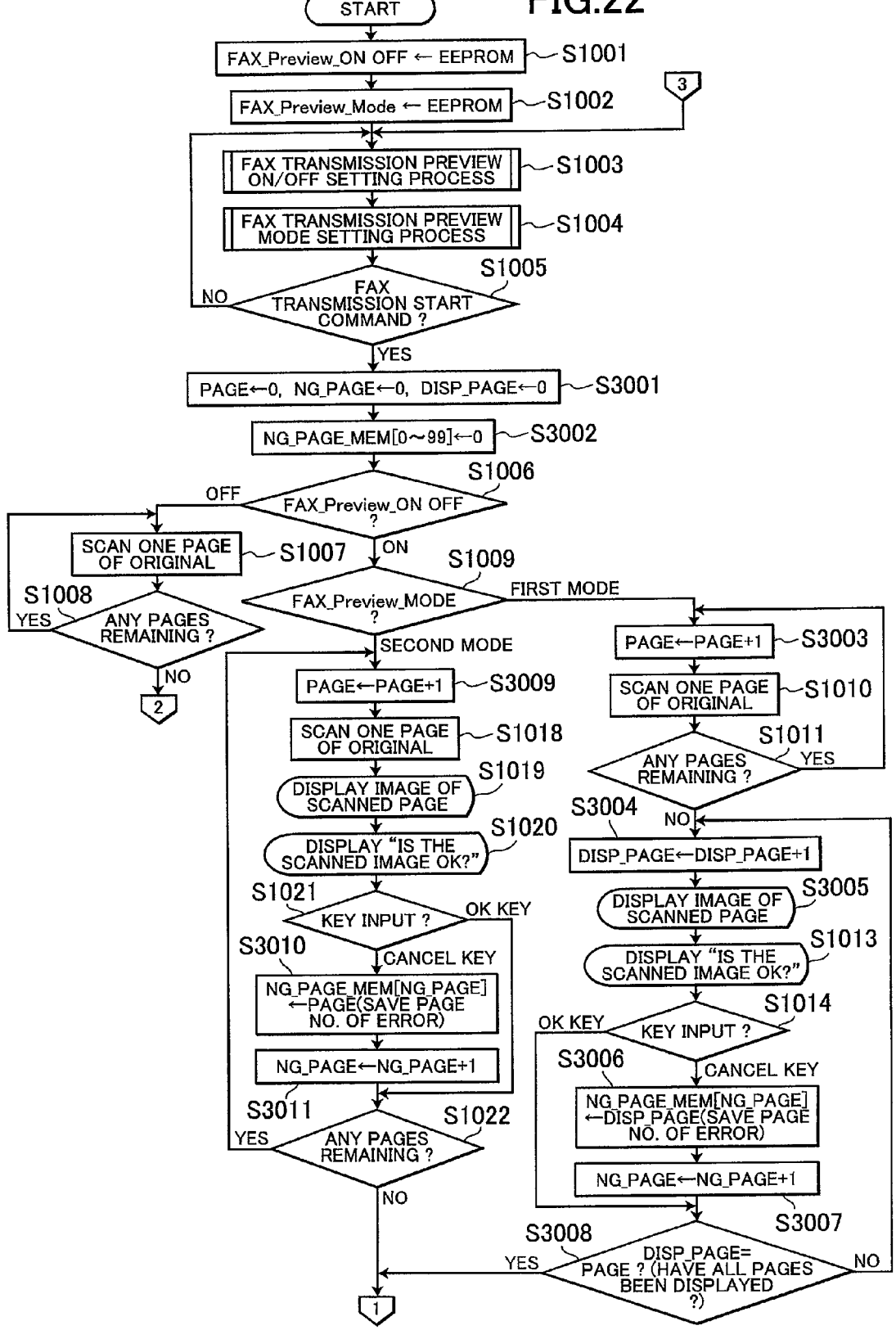
FIG. 22 is a flowchart illustrating former part of steps in an image data displaying process according to the fourth embodiment of the invention.
Figure 23:
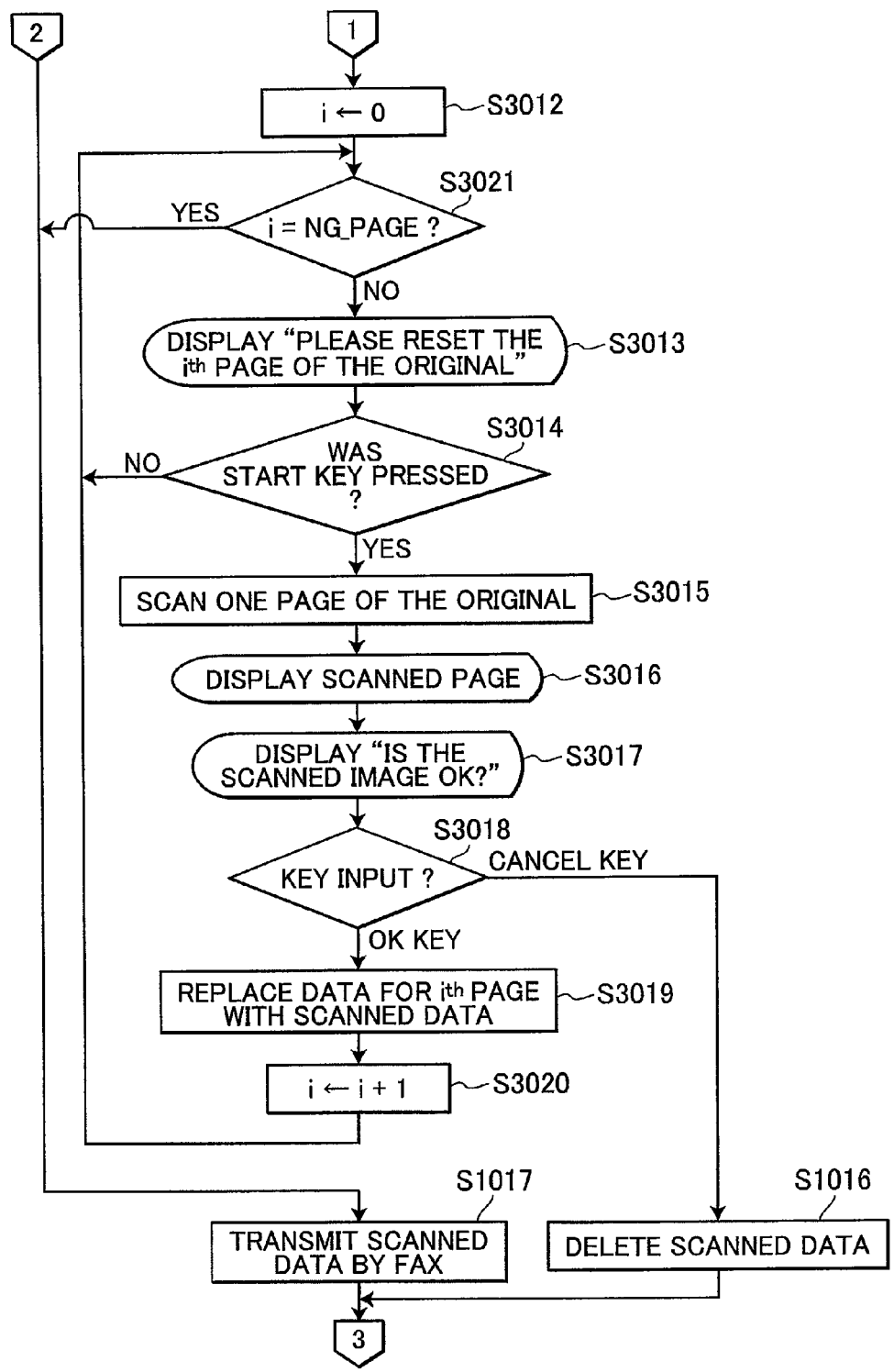
FIG. 23 is a flowchart illustrating latter part of steps in the image data displaying process according to the fourth embodiment of the invention.

FIGS. 22 and 23 show a flowchart illustrating steps in an image data displaying process executed according to the image data displaying program 41C. It should be noted that the following description will focus on only the differences from the second embodiment, while shared points in the two embodiments have been designated with the same reference numerals in the drawings and specification to avoid duplicating description.

As shown in FIG. 22, when the process starts, the above-described processes in S1001 to S1005 are executed. If the fax transmission start command has been inputted (S1005: YES), then in S3001, the CPU 31 initializes to 0 each of a page counter PAGE, a failed page counter NG_PAGE, and a display page counter DISP_PAGE.

In S3002, the CPU 31 stores a 0 at each of the addresses 0-99 provided in the failed page memory 44.

If the ON/OFF setting at the address FAX_Preview_ON OFF of the RAM 33 is the ON setting (S1006: ON) and the mode setting at the address FAX_Preview_Mode of the RAM 33 is the first mode (S1009: first mode), then scanned image data is displayed on the display unit 30 one page at a time after the entire document has been scanned. When pages in the scanned original have scanning problems, those pages are identified and stored.

Specifically, in S3003, the CPU 31 increments the page counter PAGE by 1. In S1010, the CPU 31 scans the first page of the original and, in S1011, determines whether or not successive pages exist. When successive pages exist (S1011: YES), the CPU 31 returns to S3003 and increments the page counter PAGE by 1 to confirm that the second page of the original is being read. By repeating the processes in S3003, S1010, and S1011 described above, the CPU 31 reads the entire original while confirming the scanned page number of each page scanned.

After the entire document has been read (S1011: NO), then in S3004, the CPU 31 increments the display page counter DISP_PAGE by 1 to confirm that the first page of the scanned original is being displayed on the display unit 30.

In S3005, the CPU 31 displays image data corresponding to the page indicated by the display page counter DISP_PAGE on the display unit 30. In S1013, the CPU 31 displays the confirmation message "Is the scanned image OK?" on the display unit 30, prompting the user to determine whether the scanned state is satisfactory. If the OK key 27 is pressed (S1014: OK key), indicating that the user has determined the quality of the scanned image is satisfactory, then the CPU 31 advances to S3008.

However, if an error occurred when scanning the image due to the image being skewed when scanned or the page being set upside down, for example, then the user presses the Cancel key 28 (S1014: Cancel key) while the problematic image data is displayed on the display unit 30. In this case, in S3006, the CPU 31 stores the page number indicated by the display page counter DISP_PAGE at the address in the failed page memory 44 indicated by the failed page counter NG_PAGE. At this time, the number of the page having the problem (page 1, for example) is stored at address [0] of the failed page memory 44, that is, in the initial storage area of the failed page memory 44. In S3007, the CPU 31 increments the failed page counter NG_PAGE by 1 and advances to S3008.

In S3008, the CPU 31 determines whether the page number indicated by the display page counter DISP_PAGE matches the page number indicated by the page counter PAGE. In other words, the CPU 31 determines whether images for the entire scanned original have been displayed on the display unit 30. If all pages of the original have not yet been displayed (S3008: NO), then the CPU 31 returns to S3004 and prepares to display image data for the next page on the display unit 30. When the CPU 31 determines that all pages of the original have been displayed (S3008: YES), then the CPU 31 advances to S3012 of FIG. 23.

On the other hand, when the CPU 31 determines in S1009 that the mode setting stored at the address FAX_Preview_Mode of the RAM 33 is the second mode (S1009: second mode), then the CPU 31 displays image data of the scanned image on the display unit 30 after each page is scanned and identifies and stores pages of the original in which scanning problems have occurred.

More specifically, in S3009, the CPU 31 increments the page counter PAGE by 1 and advances to S1018. In the processes of S1018-S1021, the CPU 31 displays a scanned image of each page on the display unit 30 after each page of the original is scanned and prompts the user to check the quality of the scanned image.

If the user determines that the scanned image is satisfactory and presses the OK key 27 (S1021: OK key), then the CPU 31 advances to S1022.

However, if the user notices a problem in the scanned state and presses the Cancel key 28 (S1021: Cancel key), then in S3010, the CPU 31 stores the page number indicated by the page counter PAGE in the address of the failed page memory 44 indicated by the failed page counter NG_PAGE, thereby identifying the page number in the original for which a scanning problem occurred. In S3011, the CPU 31 increments the failed page counter NG_PAGE by 1 and advances to S1022.

If the CPU 31 determines in S1022 that successive pages exist (S1022: YES), then the CPU 31 returns to S3009 and prepares to read the next page of the original. However, if the CPU 31 determines that there are no more pages to scan (S1022: NO), then the CPU 31 advances to S3012 in FIG. 23.

In S3012 of FIG. 23, the CPU 31 initializes a variable i to 0. The variable i is used for orderly searching data stored in the failed page memory 44.

Then, in S3021, the CPU 31 determines whether the variable i matches the address indicated by the failed page counter NG_PAGE. If not (S3021: NO), then in S3013, the CPU 31 acquires the page number stored at the $i^{th}$ address from the top of the failed page memory 44 and displays a message on the display unit 30 specifying the acquired page number and instructing the user to set the page of the original with this number in the image reading unit 12. For example, if the page number "5" is stored at address [0] of the failed page memory 44, indicating that a scanning problem occurred in the fifth page of the original, the CPU 31 displays the message "Please reset the fifth page of the original" on the display unit 30.

In S3014, the CPU 31 determines whether the Start key 29 has been pressed in order to confirm whether the user has reset the specified page of the original. If the Start key 29 has not been pressed (S3014: NO), then the CPU 31 loops back to S3013.

However, if the user resets the specified page in the ADF 21 or places the specified page on the platen glass 18 and presses the Start key 29 (S3014: YES), then in S3015, the CPU 31 scans the page. In S3016, the CPU 31 displays a preview of the scanned image data on the display unit 30. In S3017, the CPU 31 displays the confirmation message "Is the scanned image OK?" on the display unit 30. In S3018, the CPU 31 determines whether either the OK key 27 or the Cancel key 28 has been pressed. Through the processes in S3015-S3018, the CPU 31 rescans a page of the original for which a scanning problem occurred in the first scan and enables the user to confirm the state of the rescanned page on the display unit 30.

If the user presses the Cancel key 28 at this time (S3018: Cancel key), then the CPU 31 advances to S1016 and deletes all image data scanned from the original. Subsequently, the CPU 31 returns to S1003 of FIG. 22 and enters the standby state.

However, if the user presses the OK key 27 (S3018: OK key), then in S3019, the CPU 31 replaces image data for the page corresponding to the page number stored at the $i^{th}$ address in the failed page memory 44 with the image data rescanned in S3015. In S3020, the CPU 31 increments the variable i by 1 and returns to S3021.

If a positive determination is made in S3021 (S3021: YES), then the CPU 31 advances to S1017 to transmit the scanned original by fax. Subsequently, the CPU 31 returns to S1003 of FIG. 22 and enters the standby state.

Note that in the fourth embodiment described above, scanned and rescanned image data for the original are stored in the RAM 33.

As described above, when scanning problems occur, the multifunction device 1C stores the page number in the original for which the scanning error occurred. After scanning the entire original, the multifunction device 1C displays page numbers of the original at which scanning errors occurred on the display unit 30. After the user resets the page having the page number displayed on the display unit 30 and rescans the page, the multifunction device 1C replaces the previously scanned image data for that page with the rescanned image data. Accordingly, the multifunction device 1C can efficiently accumulate only satisfactorily scanned image data in the RAM 33. Further, the multifunction device 1C performs all rescanning operations together after the initial scanning operation is completed, thereby improving operability.

Further, the multifunction device 1C can identify pages of the original in which scanning errors occurred based on the page numbers stored at addresses of the failed page memory 44. During the rescanning operation, the multifunction device 1C displays on the display unit 30 a confirmation message specifying the page to be rescanned based on the page number stored in the failed page memory 44. Hence, when the user is waiting to perform the rescanning operations all at once after the initial scanning is completed, the multifunction device 1C facilitates the user in confirming the page number of the original to be rescanned by displaying the number on the display unit 30, thereby eliminating the need for the user to sort and remember pages for which problems had been detected. By enabling the user to rescan pages of an original displayed on the display unit 30, the multifunction device 1C reduces the load placed on the user during rescanning and improves operability.

Fifth Embodiment

Next, a fifth embodiment of the invention will be described. As shown in FIG. 21, a multifunction device 1D according to the fifth embodiment is the same as the above-described multifunction device 1C according to the fourth embodiment but differs in that an image data displaying program 41D is stored in the EEPROM 34 rather than the image data displaying program 41C. The image data displaying program 41D is similar to the image data displaying program 41C by enabling the user to rescan pages of an original not properly scanned the first time and replacing the first image data with the rescanned data. However, the image data displaying program 41D differs from the image data displaying program 41C in that all pages of the original are rescanned when scanning problems occur, and image data of the original in which scanning problems occurred is replaced with image data from the rescanned original, rather than rescanning and replacing problematic pages of an original one sheet at a time. The following description focuses on differences with the fourth embodiment, while shared points in the two embodiments have been designated with the same reference numerals in the drawings and specification to avoid duplicating description.

Figure 24:
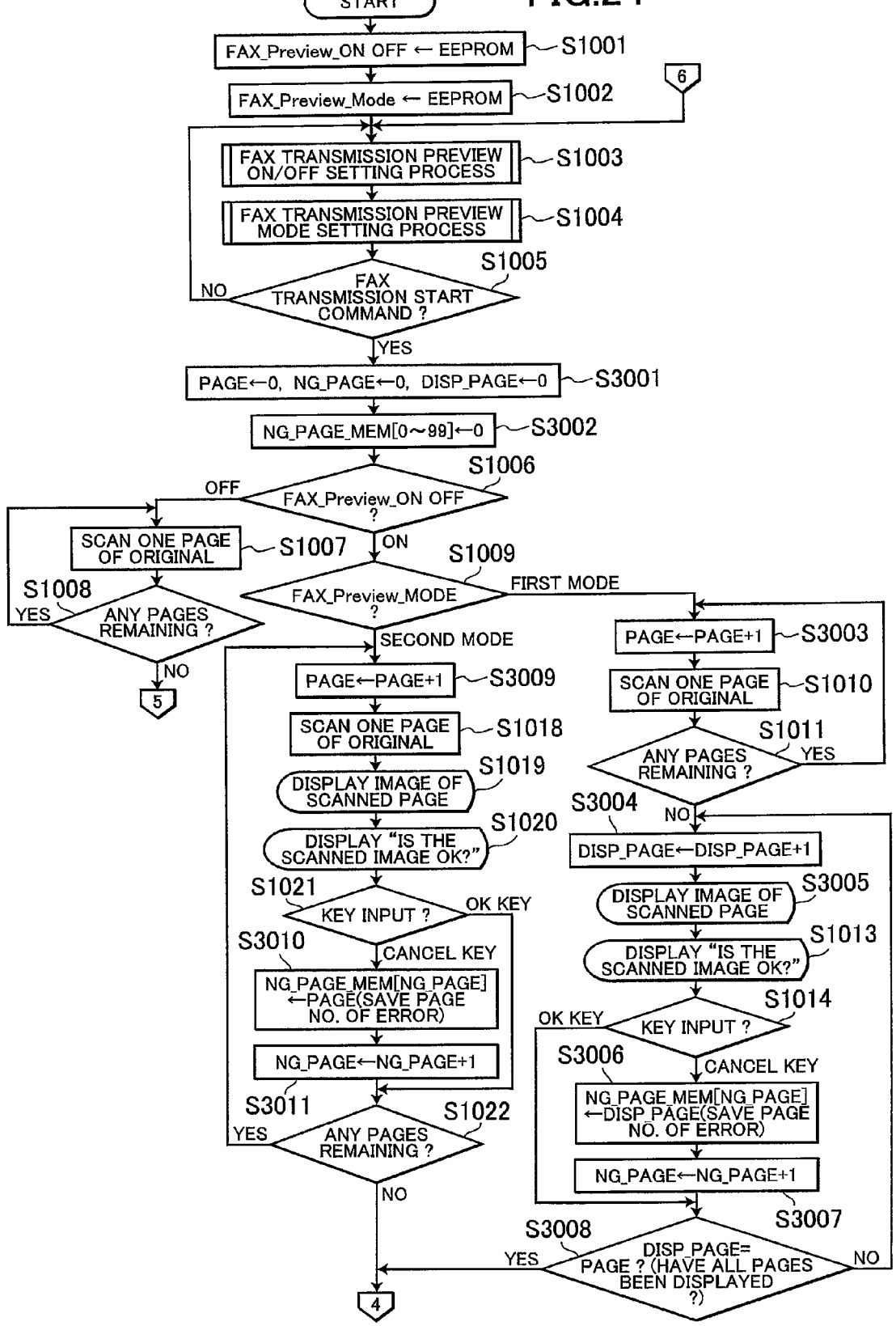
FIG. 24 is a flowchart illustrating former part of steps in an image data displaying process according to a fifth embodiment of the invention.
Figure 25:
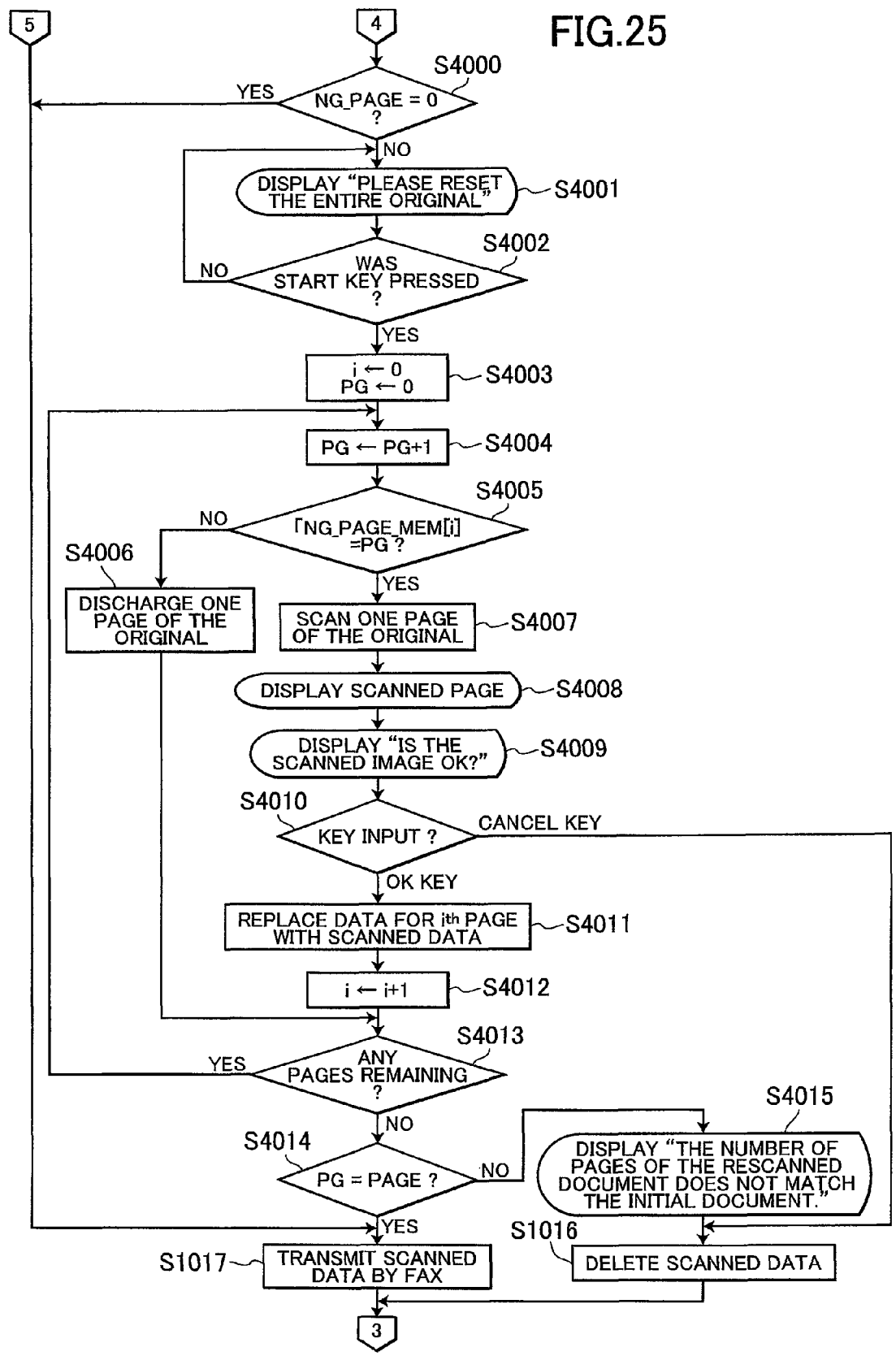
FIG. 25 is a flowchart illustrating latter part of steps in the image data displaying process according to the fifth embodiment of the invention.

FIGS. 24 and 25 show a flowchart illustrating steps in an image data displaying process executed based on the image data displaying program 41D using the multifunction device ID. The process in FIG. 24 is identical to that shown in FIG. 22. Therefore, description of the process in FIG. 24 will be omitted.

After the user has confirmed the scanning state for the entire original according to the first mode or the second mode in the process of FIG. 24, in S4000 of FIG. 25, the CPU 31 determines whether or not the failed page counter NG_PAGE is equal to 0. If so (S4000: YES), then this means that the entire original has been properly read, and thus the CPU 31 advances to S1017 to transmit a fax of the scanned data. Subsequently, the CPU 31 returns to S1003 of FIG. 24 and enters the standby state.

On the other hand, if not (S4000: NO), then in S4001, the CPU 31 displays the message "Please reset the entire original" on the display unit 30. In S4002, the CPU 31 determines whether the user has pressed the Start key 29 in order to determine whether the user has reset the original.

If the Start key 29 has not been pressed (S4002: NO), then the CPU 31 waits until the Start key 29 is pressed.

Once the user has set the entire original in the document tray 22 and pressed the Start key 29 (S4002: YES), in S4003, the CPU 31 initializes to 0 a variable i and a transmission page counter PG. Through this process, the CPU 31 can search the failed page memory 44 from the initial storage area. Further, the transmission page counter PG is reset to begin counting the page numbers of the original conveyed by the ADF 21.

In S4004, the CPU 31 increments the transmission page counter PG by 1 and, in S4005, determines whether or not the page number stored in the $i^{th}$ address of the failed page memory 44 is equivalent to the page number indicated by the transmission page counter PG in order to determine whether the page of the original to be read is a page in which a scanning problem occurred.

If not (S4005: NO), then the CPU 31 determines that the scanned state of the current page is satisfactory. Accordingly, in S4006, the CPU 31 discharges one page of the original without scanning the image thereon, and advances to S4013.

However, if so (S4005: YES), this means that a problem occurred when scanning the page previously and the page must be rescanned. Therefore, in S4007, the CPU 31 scans one page of the original. In S4008, the CPU 31 displays image data for the scanned page in a preview on the display unit 30. In S4009, the CPU 31 displays the confirmation message "Is the scanned image OK?" on the display unit 30. In S4010, the CPU 31 determines whether either the OK key 27 or the Cancel key 28 was pressed.

If the CPU 31 determines that the Cancel key 28 was pressed (S4010: Cancel key), then the CPU 31 advances to S1016 and deletes all image data scanned from the original. Subsequently, the CPU 31 returns to S1003 of FIG. 24 and enters the standby state.

However, if the CPU 31 determines that the OK key 27 was pressed (S4010: OK key), then in S4011, the CPU 31 replaces image data corresponding to the page stored at the $i^{th}$ address of the failed page memory 44 with the rescanned image data. In S4012, the CPU 31 increments the variable i by 1 to prepare for rescanning the next page.

In S4013, the CPU 31 determines whether or not successive pages of the original remain. If so (S4013: YES), then the CPU 31 returns to S4004. However, if not (S4013: NO), then in S4014, the CPU 31 determines whether the page number indicated by the transmission page counter PG matches the page number indicated by the page counter PAGE. This process is performed to determine whether the user properly set the original in the document tray 22 to be rescanned by determining whether the number of pages in the original set in the document tray 22 matches the number of pages of the original that was initially scanned.

If so (S4014: YES), then in S1017, the CPU 31 transmits the image data for the scanned original by fax.

However, if the ADF 21 feeds two sheets of the original at one time or if the user forgets to include a sheet of the original in the document tray 22, the page number indicated by the transmission page counter PG may not match the page number indicated by the page counter PAGE. In such a case (S4014: NO), the scanning process cannot be completed properly. Therefore, in S4015, the CPU 31 displays the warning message "The number of pages of the rescanned document does not match the initial document." Then, in S4016, the CPU 31 deletes all image data scanned from the original. Subsequently, the CPU 31 returns to S1003 of FIG. 24 and enters the standby state.

Note that in the fifth embodiment described above, both data for the scanned original and data for the rescanned original are stored in the RAM 33.

As described above, when a scanning problem occurs with the multifunction device 1D, the multifunction device 1D stores the page number of the original in which the problem occurred in the failed page memory 44. After the entire original is scanned, the user is prompted to reset the entire document in the document tray 22 to be rescanned, and the multifunction device 1D conveys pages of the original one sheet at a time and rescans only those pages with which problems occurred. Image data for the rescanned original is subsequently written over image data previously scanned from the original. Hence, the multifunction device 1D can efficiently accumulate only satisfactorily scanned image data in the RAM 33. Further, the multifunction device 1D simplifies the rescanning process by eliminating the need to set individual sheets of the original in the document tray 22 to be rescanned.

While the invention has been described in detail with reference to specific embodiments thereof, it would be apparent to those skilled in the art that many modifications and variations may be made therein without departing from the spirit of the invention, the scope of which is defined by the attached claims.

The embodiments described above give the multifunction devices as examples of the image reading device. However, the image-reading device of the present invention may be a copier, scanner, facsimile machine, or any device that scans images.

In the embodiments described above, the user performs operations, such as selecting the first mode and the second mode, using keys in the control panel 23, but the user may instead input selections on a touch panel displayed on the display unit 30.

The embodiments described above give examples of transmitting image data by fax over a public telephone line. However, the invention may also be applied to cases in which an Internet fax is used to transmit image data or a LAN is used to transmit image data to another personal computer.

In the embodiments described above, the CPU 31 returns to the standby state after deleting all scanned data (in S1016 of FIGS. 16, 20, 23, and 25). However, after deleting all scanned data, the CPU 31 may instead display a message on the display unit 30 prompting the user to rescan the original from the beginning, and may remain in that state or return to the standby state thereafter.

In the embodiments described above, all messages are displayed on the display unit 30. However, messages may also be outputted as voice.

What is claimed is:

1. A communication device comprising:
    a storing unit;
    a first determining unit that determines whether available memory in the storing unit is greater than a first prescribed capacity;
    a reading error display unit that displays a reading error message when the first determining unit determines that the available memory in the storing unit is less than or equal to the first prescribed capacity;
    an image data generating unit configured to generate first image data by reading an image on an original when the first determining unit determines that the available memory in the storing unit is greater than the first prescribed capacity;
    a controller configured to control the storing unit to store the first image data when the image data generating unit generates the first image data;
    a second determining unit that determines whether the available memory in the storing unit storing the first image data is greater than a second prescribed capacity when the storing unit stores the first image data;
a preview error display unit that displays a preview error message when the second determining unit determines that the available memory in the storing unit storing the first image data is less than or equal to the second prescribed capacity;
a preview data generating unit that generates preview data corresponding to the first image data stored in the storing unit when the second determining unit determines that the available memory in the storing unit storing the first image data is greater than the second prescribed capacity;
a preview display unit that displays a predetermined-unit-worth of the preview data generated by the preview data generating unit; and
a transmitting unit that transmits the first image data to a first destination upon reception of a transmission command after the preview display unit has displayed the preview data.

2. The communication device according to claim 1, wherein the image data generating unit generates the first image data by reading the image on the original to generate scanned data and converting the scanned data into the first image data.

3. The communication device according to claim 1, further comprising:
at least two units selected from among: a holding unit that places a job relating to the first image data on hold while the first image data is being stored in the storing unit and that adds job data to an on-hold job list, the job data indicating that the job is placed on hold; a deleting unit that deletes the first image data from the storing unit; a preview-less controller that controls the transmitting unit to transmit the first image data while preventing the preview display unit from displaying the preview data; and
a selecting unit that selects, based on a user operation, one of the at least two units that is activated when the preview error display unit displays the preview error message.

4. The communication device according to claim 1, further comprising a holding unit that places a job relating to the first image data on hold while the first image data is being stored in the storing unit and adds job data to an on-hold job list when the preview error display unit displays the preview error message, the job data indicating that the job is placed on hold.

5. The communication device according to claim 4, further comprising a job display unit that displays the job data and another job data included in the on-hold job list such that the job data is capable of being distinguished from the another job data, the another job data having been added to the on-hold job list by a unit differing from the holding unit.

6. The communication device according to claim 4, further comprising a determining/displaying unit that repeatedly determines whether the available memory in the storing unit is greater than the second prescribed capacity after the holding unit has placed the job on hold, the determining/displaying unit displaying a notification message notifying that a preview display is possible when the determining/displaying unit determines that the available memory in the storing unit is greater than the second prescribed capacity.

7. The communication device according to claim 4, further comprising a mail transmitting unit that transmits to a second destination an e-mail message appended with the first image data stored in the storing unit after the holding unit has placed the job on hold.

8. The communication device according to claim 4, wherein the second determining unit repeatedly determines whether the available memory in the storing unit storing the first image data is greater than the second prescribed capacity after the holding unit has placed the job on hold; and
a memory error display unit that displays a memory error message indicating existence of the first image data that is not yet displayed in a preview when the second determining unit determines that the available memory in the storing unit storing the first image data is less than or equal to the second prescribed capacity.

9. The communication device according to claim 1, further comprising:
a receiving unit that receives second image data from an external device and stores the second image data into the storing unit;
an image display unit that displays the second image data;
a mode selection unit that selects one of a first mode, in which the transmitting unit transmits the first image data after the preview display unit has displayed the preview data, and a second mode, in which the image display unit displays the second image data;
an activating unit that activates one of the image data generating unit and the image display unit upon reception of a user command,
wherein the activating unit activates the image data generating unit when the first mode is selected and activates the image display unit when the second mode is selected.

10. The communication device according to claim 1, further comprising:
a first operation unit;
a second operation unit differing from the first operation unit;
a transmission control unit that controls the transmitting unit to transmit the first image data after controlling the preview display unit to display the preview data when a user operates the first operation unit, the transmission control unit controlling the transmitting unit to transmit the first image data without controlling the preview display unit to display the preview data when the user operates the second operation unit.

11. The communication device according to claim 1, wherein the controller further controls the storing unit storing the first image data to store the preview data when the preview data generating unit generates the preview data,
wherein the preview display unit displays the predetermined-unit-worth of preview data stored in the storing unit at one time when the storing unit stores the preview data.

12. A communication device comprising:
an image data generating unit that generates first image data by reading an image on an original;
an image data storing unit that stores the first image data;
a preview data generating unit that generates preview data from the first image data;
a preview data storing unit that stores the preview data;
a determining unit that determines whether an available memory in the preview data storing unit is sufficient to store the preview data;
a preview error display unit that displays a preview error message when the determining unit determines that the available memory is insufficient;
a controller that stores the preview data generated by the preview data generating unit into the preview data storing unit when the determining unit determines that the available memory is sufficient;

a preview display unit that displays a predetermined-unit-worth of the preview data stored in the preview data storing unit at one time;

a transmitting unit that transmits the first image data to a destination upon reception of a transmission command after the preview display unit has displayed the preview data;

a holding unit that places a job relating to the first image data on hold while the first image data is being stored in the image data storing unit and adds job data to an on-hold job list when the preview error display unit displays the preview error message, the job data indicating that the job is placed on hold; and a determining/transmitting unit that repeatedly determines whether the available memory in the preview data storing unit is sufficient to store the preview data after the holding unit has placed the job on hold, the determining/transmitting unit transmitting to a second destination an e-mail message indicating that a preview display is possible when determining/transmitting unit determines that the available memory is sufficient.

13. A communication device comprising:

an image data generating unit that generates first image data by reading an image on an original;

an image data storing unit that stores the first image data;

a preview data generating unit that generates preview data from the first image data;

a preview data storing unit that stores the preview data;

a determining unit that determines whether available memory in the preview data storing unit is sufficient to store the preview data;

a preview error display unit that displays a preview error message when the determining unit determines that the available memory is insufficient;

a controller that stores the preview data generated by the preview data generating unit into the preview data storing unit when the determining unit determines that the available memory is sufficient;

a preview display unit that displays a predetermined-unit-worth of the preview data stored in the preview data storing unit at one time;

a transmitting unit that transmits the first image data to a first destination upon reception of a transmission command after the preview display unit has displayed the preview data;

a holding unit that places a job relating to the first image data on hold while the first image data is being stored in the image data storing unit and adds job data to an on-hold job list when the preview error display unit displays the preview error message, the job data indicating that the job is placed on hold; and a determining/notifying unit that repeatedly determines whether the available memory in the preview data storing unit is sufficient to store the preview data after the holding unit has placed the job on hold, the determining/notifying unit making a phone call to a predetermined telephone number and outputting a voice message indicating that a preview display is possible when determining/notifying unit determines that the available memory is sufficient.

14. A communication device comprising:

an image data generating unit that generates first image data by reading an image on an original;

an image data storing unit that stores the first image data;

a preview data generating unit that generates preview data from the first image data;

a preview data storing unit that stores the preview data;

a first determining unit that determines whether an available memory in the preview data storing unit is sufficient to store the preview data;

a preview error display unit that displays a preview error message when the first determining unit determines that the available memory is insufficient;

a controller that stores the preview data generated by the preview data generating unit into the preview data storing unit when the first determining unit determines that the available memory is sufficient;

a preview display unit that displays a predetermined-unit-worth of the preview data stored in the preview data storing unit at one time;

a transmitting unit that transmits the first image data to a first destination upon reception of a transmission command after the preview display unit has displayed the preview data;

a holding unit that places a job relating to the first image data on hold while the first image data is being stored in the image data storing unit and adds job data to an on-hold job list when the preview error display unit displays the preview error message, the job data indicating that the job is placed on hold; and a second determining unit that repeatedly determines whether the available memory in the preview data storing unit is sufficient to store the preview data after the holding unit has placed the job on hold;

at least two units selected from among:

a first mail transmitting unit that transmits to a second destination a first e-mail message appended with the first image data stored in the image data storing unit after the holding unit has placed the job on hold;

a second mail transmitting unit that transmits to the second destination a second e-mail message indicating that a preview display is possible when the second determining unit determines that the available memory is sufficient; and a notifying unit that makes a phone call to a predetermined telephone number and outputs a voice message indicating that a preview display is possible when the second determining unit determines that the available memory is sufficient; and a selecting unit that selects one of the at least two units to be activated, based on a user operation.

15. A communication device comprising:

a storing unit;

an image reading unit that generates first image data by reading an image on an original;

a reading error display unit configured to display a reading error message;

a preview error display unit configured to display a preview error message;

a processing unit;

a memory having executable instructions stored thereon that, when executed by the processing unit, causes the communication device to perform the steps of:

determining whether an available memory in the storing unit is greater than a first prescribed capacity;

storing the first image data in the storing unit when the determining determines that the available memory in the storing unit is greater than the first prescribed capacity;

controlling the reading error display unit to display the reading error message when the available memory in the storing unit is less than or equal to the first prescribed capacity;

determining whether the available memory in the storing unit storing the first image data is greater than a second prescribed capacity when the storing unit stores the first image data, generating preview data corresponding to the first image data stored in the storing unit when the available memory in the storing unit storing the first image data is greater than the second prescribed capacity, and controlling the preview error display unit to display the preview error message without generating the preview data for display when the available memory in the storing unit storing the first image data is less than or equal to the second prescribed capacity;

a preview display unit that displays a predetermined-unit-worth of the preview data generated by the processing unit; and a transmitting unit that transmits the first image data to a first destination upon reception of a transmission command after the preview display unit has displayed the preview data.

16. The communication device according to claim 15, wherein the processing unit performs further step of storing the preview data in the storing unit when the available memory in the storing unit storing the first image data is greater than the second prescribed capacity, wherein the preview display unit displays the predetermined-unit-worth of preview data stored in the storing unit when the storing unit stores the preview data.

* * * * *